US012610413B2

(12) United States Patent
Guo et al.

(10) Patent No.: US 12,610,413 B2
(45) Date of Patent: Apr. 21, 2026

(54) UNICAST MEASUREMENT AND DETERMINATION FOR SPACE-DIVISION MULTIPLEXED TRANSMISSION WITH MULTIPLE TRANSMISSION RECEPTION POINTS

(71) Applicant: QUALCOMM Incorporated, San Diego, CA (US)

(72) Inventors: Hui Guo, Beijing (CN); Kapil Gulati, Belle Mead, NJ (US); Sourjya Dutta, San Diego, CA (US); Shuanshuan Wu, San Diego, CA (US); Junyi Li, Fairless Hills, PA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/034,033

(22) PCT Filed: Dec. 31, 2020

(86) PCT No.: PCT/CN2020/141962
§ 371 (c)(1),
(2) Date: Apr. 26, 2023

(87) PCT Pub. No.: WO2022/141345
PCT Pub. Date: Jul. 7, 2022

(65) Prior Publication Data
US 2023/0389100 A1 Nov. 30, 2023

(51) Int. Cl.
*H04W 76/15* (2018.01)
*H04B 17/336* (2015.01)
(52) U.S. Cl.
CPC .......... *H04W 76/15* (2018.02); *H04B 17/336* (2015.01)

(58) Field of Classification Search
CPC .. H04W 76/15; H04W 52/383; H04B 17/336; H04B 17/345
See application file for complete search history.

(56) References Cited

U.S. PATENT DOCUMENTS

2009/0190687 A1* 7/2009 Moon ................... H04L 1/0026
375/267
2017/0188204 A1* 6/2017 Kela ................... H04W 72/121
(Continued)

FOREIGN PATENT DOCUMENTS

CN 110832926 A 2/2020
CN 111601333 A 8/2020
(Continued)

OTHER PUBLICATIONS

Huawei, et al., "Discussion on Sidelink Resource Allocation Mode 1", 3GPP TSG RAN WG1 Meeting #97, R1-1906010, Reno, USA, May 13-17, 2019, May 17, 2019 (May 17, 2019), 9 Pages, the whole document.

(Continued)

*Primary Examiner* — Sudesh M. Patidar
(74) *Attorney, Agent, or Firm* — Procopio, Cory, Hargreaves & Savitch LLP/QUALCOMM Incorporated

(57) ABSTRACT
A first UE transmits, on a first unicast link to a second UE, a first RS from a first TRP of the first UE. The first UE receives, based on the first RS transmitted, a first channel measurement for the first unicast link from the second UE and a first interference measurement for a second unicast link from a third UE. The first UE transmits, on the second unicast link with the third UE, a second RS from a second TRP of the first UE. The first UE receives, based on the second RS transmitted, a second channel measurement for the second unicast link from the third UE and a second interference measurement for the first unicast link from the second UE. The first UE applies SDM for the first unicast (Continued)

link and the second unicast link based on the received channel and interference measurements.

35 Claims, 19 Drawing Sheets

(56) References Cited

U.S. PATENT DOCUMENTS

| | | | | |
|---|---|---|---|---|
| 2020/0022089 A1* | 1/2020 | Guo | | H04W 52/242 |
| 2020/0044802 A1* | 2/2020 | Park | | H04B 7/0486 |
| 2021/0067992 A1* | 3/2021 | Kusashima | | H04W 24/08 |
| 2021/0320768 A1* | 10/2021 | Yuan | | H04L 5/0073 |
| 2021/0336728 A1* | 10/2021 | Selvanesan | | H04L 1/1896 |
| 2022/0295419 A1 | 9/2022 | Guo | | |
| 2023/0180034 A1* | 6/2023 | Liu | | H04L 5/0048 |
| | | | | 370/252 |

FOREIGN PATENT DOCUMENTS

| | | | | |
|---|---|---|---|---|
| WO | WO-2017096954 A1 * | 6/2017 | ......... | H04B 7/0632 |
| WO | 2020013641 A1 | 1/2020 | | |

OTHER PUBLICATIONS

International Search Report and Written Opinion—PCT/CN2020/141962—ISA/EPO—Sep. 28, 2021.
Samsung: "Summary of Email Discussion for Rel.17 Enhancements on MIMO for NR", 3GPP TSG RAN Meeting #86, RP-192435, 3rd Generation Partnership Project, Mobile Competence Centre, 650, Route Des Lucioles, F-06921, Sophia-Antipolis Cedex, France, vol. TSG RAN, No. Sitges, Spain, Dec. 9, 2019-Dec. 12, 2019, Dec. 3, 2019, XP051835464, 31 Pages, p. 2, Paragraph 1—p. 5, Paragraph 3, Figures 3-4, p. 8, Paragraph 3—p. 9, Paragraph 2, p. 18, Paragraph 2, p. 32, Paragraph 2.

* cited by examiner

UNICAST MEASUREMENT AND DETERMINATION FOR SPACE-DIVISION MULTIPLEXED TRANSMISSION WITH MULTIPLE TRANSMISSION RECEPTION POINTS

CROSS REFERENCE TO RELATED APPLICATION(S)

This application is National Stage Application filed under 35 U.S.C. § 371 of PCT International Application Serial No. PCT/CN2020/141962 entitled "UNICAST MEASURE-MENT AND DETERMINATION FOR SPACE-DIVISION MULTIPLEXED TRANSMISSION WITH MULTIPLE TRANSMISSION RECEPTION POINTS" and filed on Dec. 31, 2020, which is expressly incorporated by reference herein in its entirety.

INTRODUCTION

The present disclosure relates generally to communication systems, and more particularly, to sidelink communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus is provided for wireless communication. The apparatus includes memory and at least one processor coupled to the memory, the memory and the at least one processor being configured to establish a first unicast link with a second sidelink device and a second unicast link with a third sidelink device; transmit, on the first unicast link with the second sidelink device, a first reference signal (RS) from a first transmission reception point (TRP) of the first sidelink device; receive, based on the first RS transmitted, a first channel measurement for the first unicast link from the second sidelink device and a first interference measurement for the second unicast link from the third sidelink device; transmit, on the second unicast link with the third sidelink device, a second RS from a second TRP of the first sidelink device; receive, based on the second RS transmitted, a second channel measurement for the second unicast link from the third sidelink device and a second interference measurement for the first unicast link from the second sidelink device; and apply space division multiplexing (SDM) for the first unicast link and the second unicast link based on the first channel measurement, the second channel measurement, the first interference measurement of the first unicast link, and the second interference measurement of the second unicast link.

In another aspect of the disclosure, a method is provided for wireless communication at a first sidelink device. The method includes establishing a first unicast link with a second sidelink device and a second unicast link with a third sidelink device; transmitting, on the first unicast link with the second sidelink device, a first RS from a first TRP of the first sidelink device; receiving, based on the first RS transmitted, a first channel measurement for the first unicast link from the second sidelink device and a first interference measurement for the second unicast link from the third sidelink device; transmitting, on the second unicast link with the third sidelink device, a second RS from a second TRP of the first sidelink device; receiving, based on the second RS transmitted, a second channel measurement for the second unicast link from the third sidelink device and a second interference measurement for the first unicast link from the second sidelink device; and applying SDM for the first unicast link and the second unicast link based on the first channel measurement, the second channel measurement, the first interference measurement of the first unicast link, and the second interference measurement of the second unicast link.

In another aspect of the disclosure, an apparatus is provided for wireless communication. The apparatus includes means for establishing a first unicast link with a second sidelink device and a second unicast link with a third sidelink device; means for transmitting, on the first unicast link with the second sidelink device, a first RS from a first TRP of the first sidelink device; means for receiving, based on the first RS transmitted, a first channel measurement for the first unicast link from the second sidelink device and a first interference measurement for the second unicast link from the third sidelink device; means for transmitting, on the second unicast link with the third sidelink device, a second RS from a second TRP of the first sidelink device; means for receiving, based on the second RS transmitted, a second channel measurement for the second unicast link from the third sidelink device and a second interference measurement for the third sidelink device and a second interference measurement for the first unicast link from the second sidelink device; and means for applying SDM for the first unicast link and the second unicast link based on the first channel measurement, the second channel measurement, the first interference measurement of the first unicast link, and the second interference measurement of the second unicast link.

In another aspect of the disclosure, a non-transitory computer-readable storage medium is provided for wireless communication at a first sidelink device. The computer-readable storage medium may be non-transitory, for example. The computer-readable storage medium includes code to establish a first unicast link with a second sidelink device and a second unicast link with a third sidelink device; transmit, on the first unicast link with the second sidelink device, a first RS from a first TRP of the first sidelink device; receive, based on the first RS transmitted, a first channel measurement for the first unicast link from the second sidelink device and a first interference measurement for the second unicast link from the third sidelink device; transmit, on the second unicast link with the third sidelink device, a second RS from a second TRP of the first sidelink device; receive, based on the second RS transmitted, a second channel measurement for the second unicast link from the third sidelink device and a second interference measurement for the first unicast link from the second sidelink device; and apply SDM for the first unicast link and the second unicast link based on the first channel measurement, the second channel measurement, the first interference measurement of the first unicast link, and the second interference measurement of the second unicast link.

In an aspect of the disclosure, an apparatus is provided for wireless communication. The apparatus includes memory and at least one processor coupled to the memory, the memory and the at least one processor being configured to establish a unicast link with the first sidelink device; receive, from the first sidelink device, a first RS from a first TRP of the first sidelink device; transmit, to the first sidelink device, a channel measurement for the unicast link based on measuring the first RS; receive, from the first sidelink device, a second RS from a second TRP of the first sidelink device; and transmit, from the second sidelink device an interference measurement for the unicast link based on measuring the second RS.

In another aspect of the disclosure, a method is provided for wireless communication at a second sidelink device. The method includes establishing a unicast link with the first sidelink device; receiving, at the second sidelink device, a first RS from a first TRP of the first sidelink device; transmitting, to the first sidelink device, a channel measurement for the unicast link based on measuring the first RS; receiving, at the second sidelink device, a second RS from a second TRP of the first sidelink device; and transmitting, from the second sidelink device an interference measurement for the unicast link based on measuring the second RS.

In another aspect of the disclosure, an apparatus is provided for wireless communication. The apparatus includes means for establishing a unicast link with the first sidelink device; means for receiving, from the first sidelink device, a first RS from a first TRP of the first sidelink device; means for transmitting, to the first sidelink device, a channel measurement for the unicast link based on measuring the first RS; means for receiving, from the first sidelink device, a second RS from a second TRP of the first sidelink device; and means for transmitting, from the second sidelink device an interference measurement for the unicast link based on measuring the second RS.

In another aspect of the disclosure, a non-transitory computer-readable storage medium is provided for wireless communication at a second sidelink device. The computer-readable storage medium may be non-transitory, for example. The computer-readable storage medium includes code to establish a unicast link with the first sidelink device; receive, at the second sidelink device, a first RS from a first TRP of the first sidelink device; transmit, to the first sidelink device, a channel measurement for the unicast link based on measuring the first RS; receive, at the second sidelink device, a second RS from a second TRP of the first sidelink device; and transmit, from the second sidelink device, an interference measurement for the unicast link based on measuring the second RS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 illustrates an example sidelink communication system.

FIG. 5 is a diagram illustrating an example PSFCH configuration.

DETAILED DESCRIPTION

Figure 1:
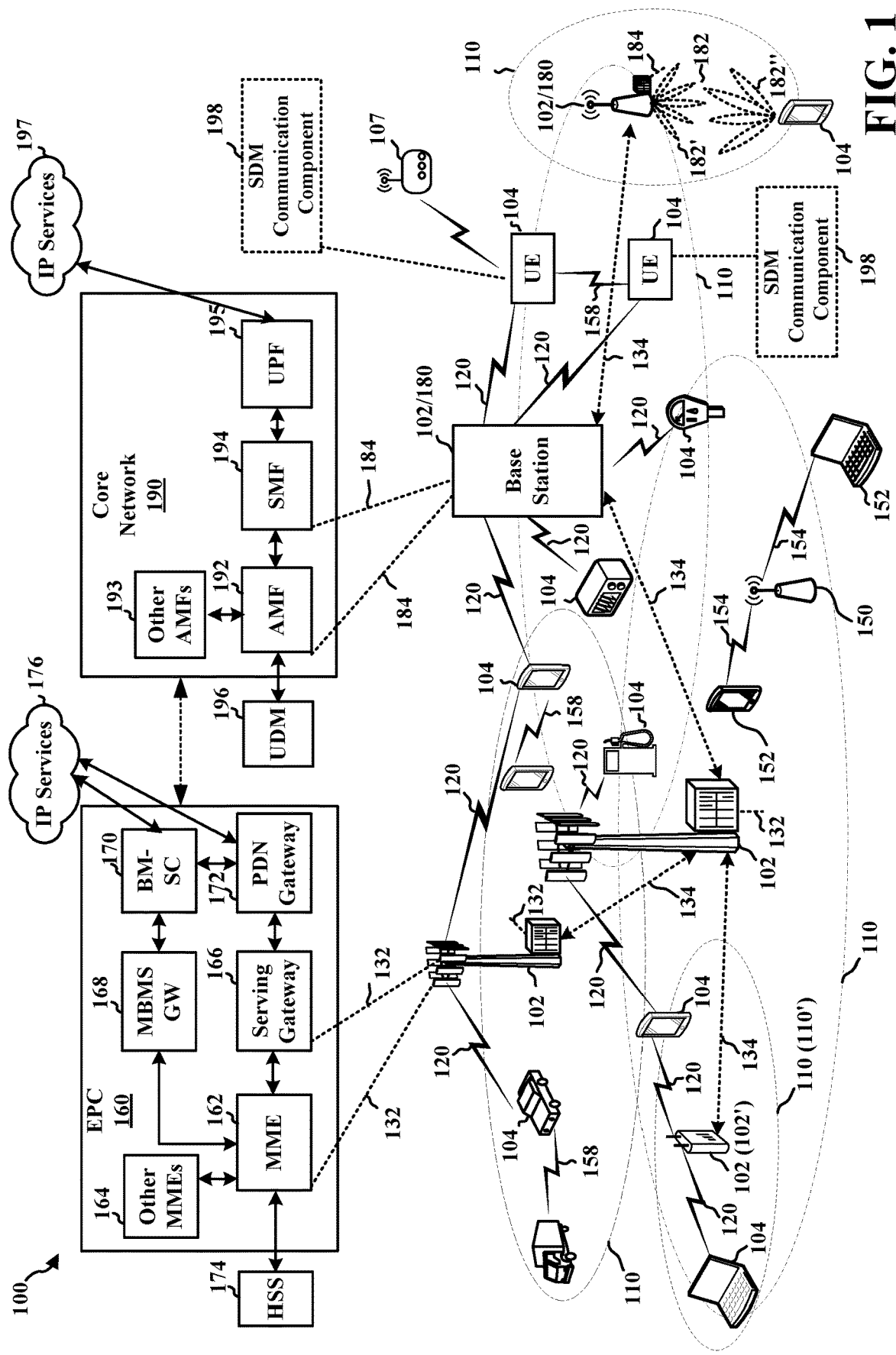
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable storage medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Sidelink communication may include direct wireless communication between multiple sidelink UEs (e.g., sidelink devices) without being routed by a base station. For example, a first sidelink device, such as a first UE, may communicate with another sidelink device (e.g., one or more additional UE(s)) based on a broadcast mode, a groupcast mode (e.g., managed or connectionless) and/or a unicast mode. Although the aspects are described for a transmitting device and a receiving device to distinguish between the two devices, both devices may be capable of transmission and reception. Although example aspects are described for UEs in order to illustrate the concept, the aspects may be applied by other sidelink devices, as well, such as a road side unit (RSU), etc. Under the broadcast mode, a transmitting sidelink UE may transmit data to one or more receiving sidelink UEs within its transmission range, but the transmitting sidelink UE may not receive a response from the receiving sidelink UEs. Under the groupcast mode, a sidelink UE may transmit data to one or more receiving sidelink UEs within its transmission range, and the one or more receiving sidelink UEs may transmit hybrid automatic repeat request (HARQ) feedback (e.g., ACK/NACK) to the transmitting sidelink UE based on whether they have successfully received/decoded the data. Under the unicast mode, a sidelink UE may establish a unicast link (e.g., a PC5 connection) with another sidelink UE, such that both UEs may transmit data, HARQ feedback, and/or control signalling to each other.

To improve coverage for sidelink communication, a sidelink UE may include multiple transmission reception points (TRPs), and the sidelink UE may communicate with other sidelink UE(s) through one or more TRPs. The multi-TRPs configuration may improve reliability, coverage, and/or capacity performance of sidelink communication by enabling more flexible deployment of TRPs or antennas for the sidelink UE. In some examples, a sidelink UE may establish multiple unicast links with multiple sidelink UEs, where the sidelink UE may communicate with other sidelink UE(s) over multiple unicast links using one or more TRPs. For sidelink communications involving multiple unicast links, to make effective use of sidelink resources or to increase/improve sidelink bandwidth, a transmitting UE may apply space-division multiplexing (SDM) to transmissions and/or receptions from the multiple unicast links. The SDM, which may also be referred to as spatial multiplexing, is a multiplexing technique that may be used in MIMO wireless communication or other communications technologies to transmit different channels separately in space. For example, when multiple antennas are used by a transmitting UE, multiple streams/signals may be transmitted with different information in different spatial directions using SDM to increase a user data bit rate. The transmitting UE may transmit data using multiple spatial layers, e.g., with a small phase shift between the spatial layers, to enable the receiving UE to decode the spatial layers separately.

Aspects presented herein may enable a transmitting UE to determine whether, or when, to enable SDM transmission for multiple unicast links. Aspects presented herein may provide improved measurement procedure(s) of SDM transmission determination for UEs that are communicating under the unicast mode. In addition, aspects presented herein may enable a transmitting UE to determine precoders for each TRP of the transmitting UE for SDM transmission.

In one aspect of the present disclosure, a sidelink device may determine whether to apply SDM transmission for multiple unicast links based at least in part on the channel measurement (e.g., CMR measurement) and the interference measurement (e.g., IMR measurement) of the multiple unicast links. For example, a transmitting sidelink device may configure multi-port CSI-RS with CMR and/or IMR resources for multiple receiving sidelink devices. Then, one or more of the multiple receiving sidelink devices may measure the channel condition and/or the interference level of their respective sidelink channels, e.g., sidelink channels in which the receiving sidelink device(s) are using for communicating with the transmitting device, and the one or more of the multiple receiving sidelink devices may feedback the channel and/or the interference measurements to the transmitting sidelink device. Based on the feedback from multiple receiving sidelink devices, the transmitting sidelink device may determine whether SDM transmission over multiple unicast destinations may be enabled or applied.

In another aspect of the present disclosure, a transmitting sidelink device may determine whether to request the multiple receiving sidelink devices to perform channel and/or interference measurements (e.g., for determining whether to apply SDM for transmissions) based on one or more defined conditions. For example, the transmitting sidelink device may request channel and/or interference measurements from multiple receiving sidelink devices by allocating CMR and/or IMR resources for the multiple receiving sidelink devices. The allocation and/or configuration of CMR/IMR resources may be triggered or scheduled by the transmitting UE based on, e.g., channel busy ratio (CBR) measurements, consecutive transmission failures (e.g., due to half duplex restrict), transmission qualities, and/or other defined condition(s), etc. For example, when the CBR of a sidelink channel is above a threshold (e.g., the sidelink channel is congested) and/or when transmitting sidelink device is unable to transmit a packet for a number of times (e.g., due to lack of sidelink resources), the transmitting sidelink device may be configured to trigger the SDM transmission determination procedure by allocating or scheduling CMR/IMR resources for the receiving sidelink devices.

FIG. 1 is a diagram illustrating an example of a wireless communications system and an access network 100. A first sidelink device (e.g., the UE 104) may include an SDM communication component 198 configured to indicate to multiple sidelink devices to perform and report channel and interference measurements for multiple unicast links. The SDM communication component 198 may also determine whether to enable/apply SDM transmission to the multiple unicast links based at least in part on the channel and interference measurements received from multiple sidelink devices. In one aspect, the SDM communication component 198 (e.g., at a first sidelink device or a transmitting sidelink device) may be configured to establish a first unicast link with a second sidelink device and a second unicast link with a third sidelink device. The SDM communication component 198 may be configured to transmit, on the first unicast link with the second sidelink device, a first RS from a first TRP of the first sidelink device. The SDM communication component 198 may be configured to receive, based on the first RS transmitted, a first channel measurement for the first unicast link from the second sidelink device and a first interference measurement for the second unicast link from the third sidelink device. The SDM communication component 198 may be configured to transmit, on the second unicast link with the third sidelink device, a second RS from a second TRP of the first sidelink device. The SDM communication component 198 may be configured to receive, based on the second RS transmitted, a second channel measurement for the second unicast link from the third sidelink device and a second interference measurement for the first unicast link from the second sidelink device. The SDM communication component 198 may be configured to apply SDM for the first unicast link and the second unicast link based on the first channel measurement, the second channel measurement, the first interference measurement of the first unicast link, and the second interference measurement of the second unicast link.

In another aspect, the SDM communication component 198 (e.g., at a second sidelink device or a receiving sidelink device) may be configured to establish a unicast link with the first sidelink device. The SDM communication component 198 may be configured to receive, from the first sidelink device, a first RS from a first TRP of the first sidelink device. The SDM communication component 198 may be configured to transmit, to the first sidelink device, a channel measurement for the unicast link based on measuring the first RS. The SDM communication component 198 may be configured to receive, from the first sidelink device, a second RS from a second TRP of the first sidelink device. The SDM communication component 198 may be configured to transmit, from the second sidelink device an interference measurement for the unicast link based on measuring the second RS.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
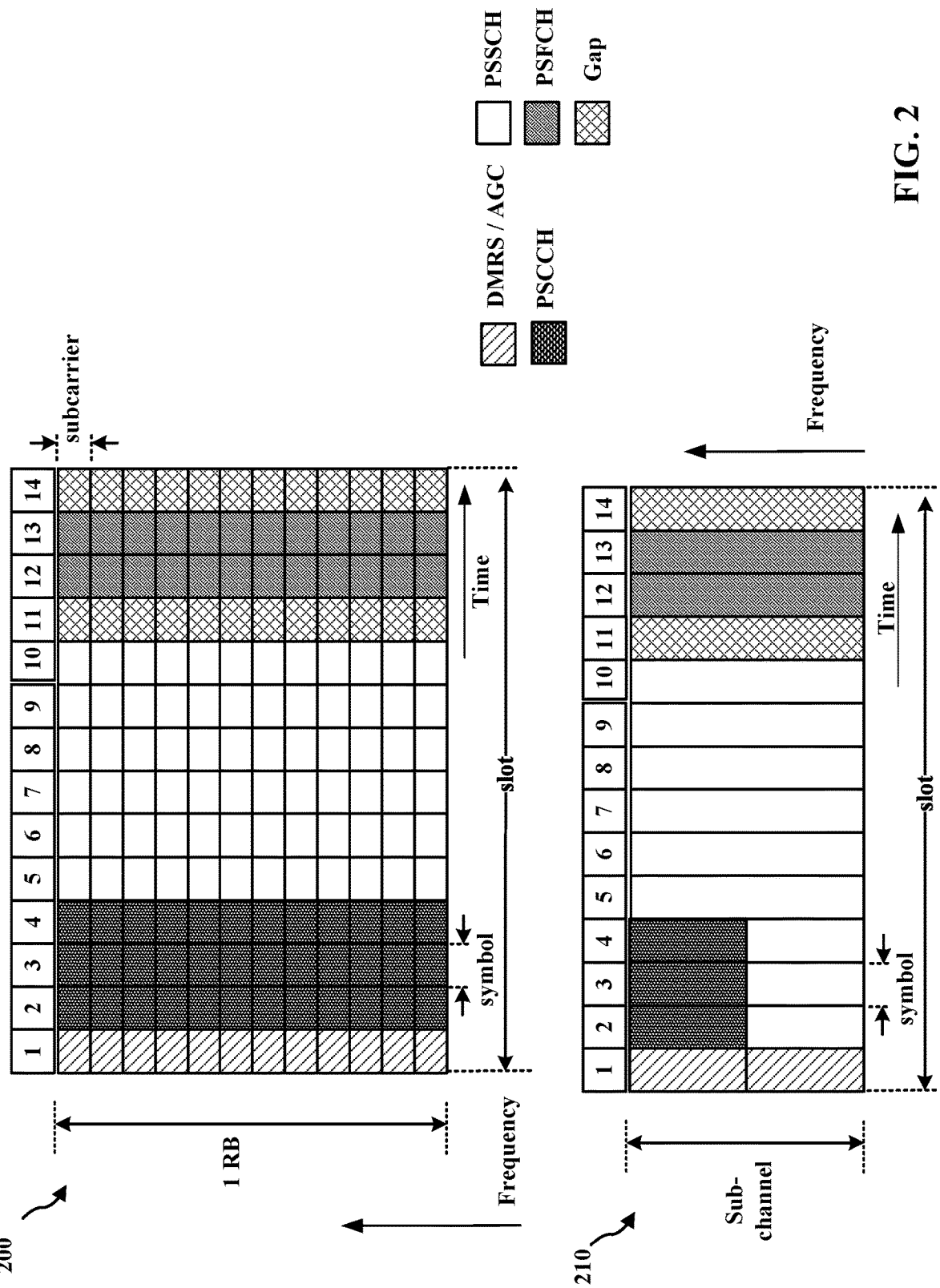
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 15, 20, 25, 50, 75, or 100 PRBs, for example. The resources for a sidelink transmission may be selected from a resource pool including one or more sub-channels. As a non-limiting example, the resource pool may include between 1-27 sub-channels. A PSCCH size may be established for a resource pool, e.g., as between % of one sub-channel for a duration of 2 symbols or 3 symbols. In some examples, the first symbol of the subframe may be a symbol for automatic gain control (AGC) usage (e.g., an AGC symbol), and the last symbol may be a symbol for transmit/receive switching time usage. The AGC symbol may be used to adjust an operating point by a receiving end. The diagram 210 in FIG. 2 illustrates an example in which the PSCCH occupies about 50% of a sub-channel, as one example to illustrate the concept of PSCCH occupying a portion of a sub-channel. The physical sidelink shared channel (PSSCH) occupies at least one sub-channel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
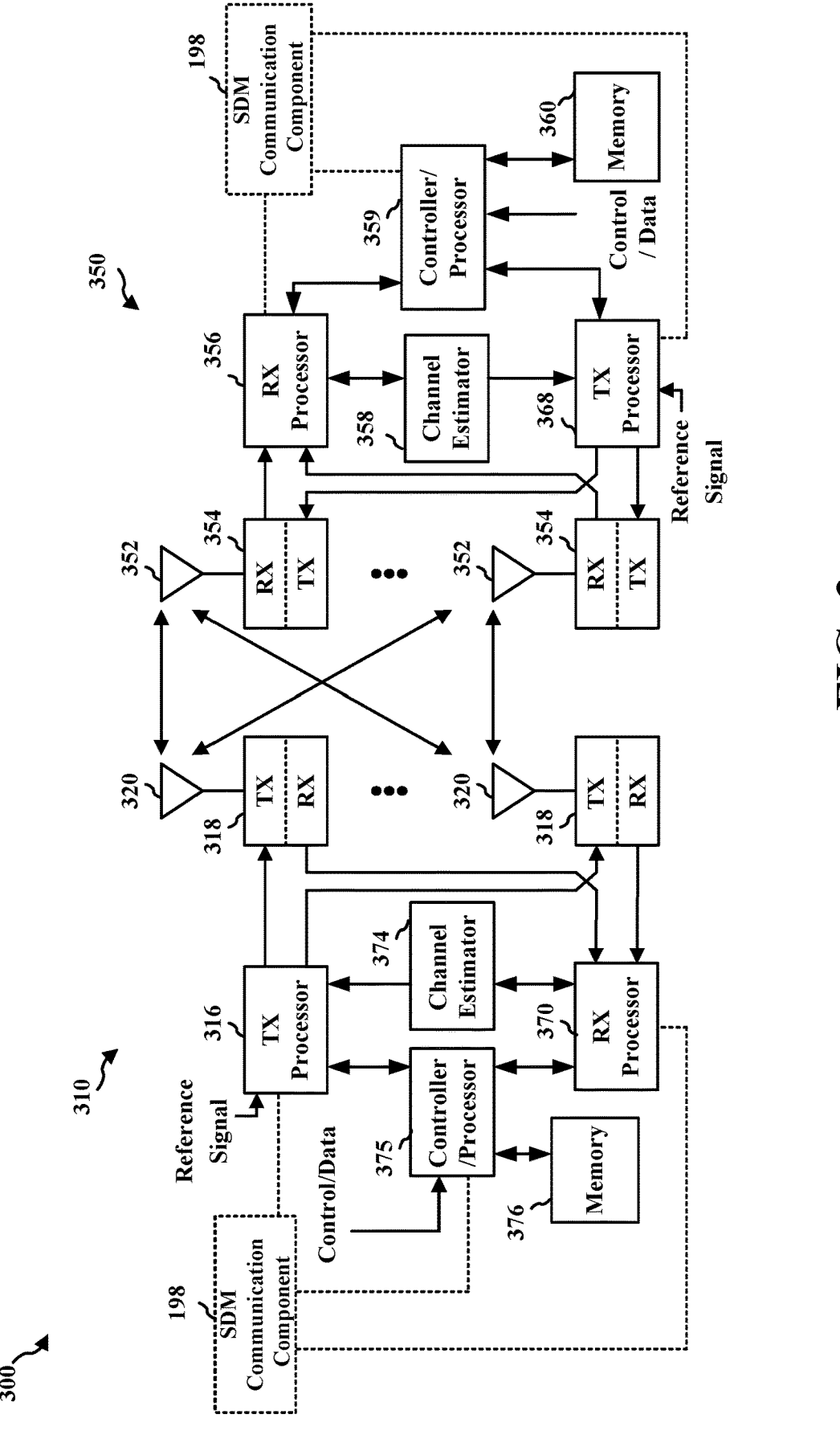
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 (TX). Each transmitter 318 (TX) may modulate an RF carrier with a respective spatial stream for transmission.

At the device 350, each receiver 354 (RX) receives a signal through its respective antenna 352. Each receiver 354 (RX) recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable storage medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354 (TX). Each transmitter 354 (TX) may modulate an RF carrier with a respective spatial stream for transmission.

The transmission is processed at the device 310 in a manner similar to that described in connection with the receiver function at the device 350. Each receiver 318 (RX) receives a signal through its respective antenna 320. Each receiver 318 (RX) recovers information modulated onto an RF carrier and provides the information to a RX processor 370.

The controller/processor 375 can be associated with a memory 376 that stores program codes and data. The memory 376 may be referred to as a computer-readable storage medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, or the controller/processor 375 may be configured to perform aspects in connection with the SDM communication component 198 of FIG. 1. For example, the SDM communication component 198 may be configured to indicate to multiple sidelink devices to perform and report channel and interference measurements for multiple unicast links. The SDM communication component 198 may also be configured to determine whether to enable/apply SDM transmission to the multiple unicast links based at least in part on the channel and interference measurements received from multiple sidelink devices.

Figure 4:
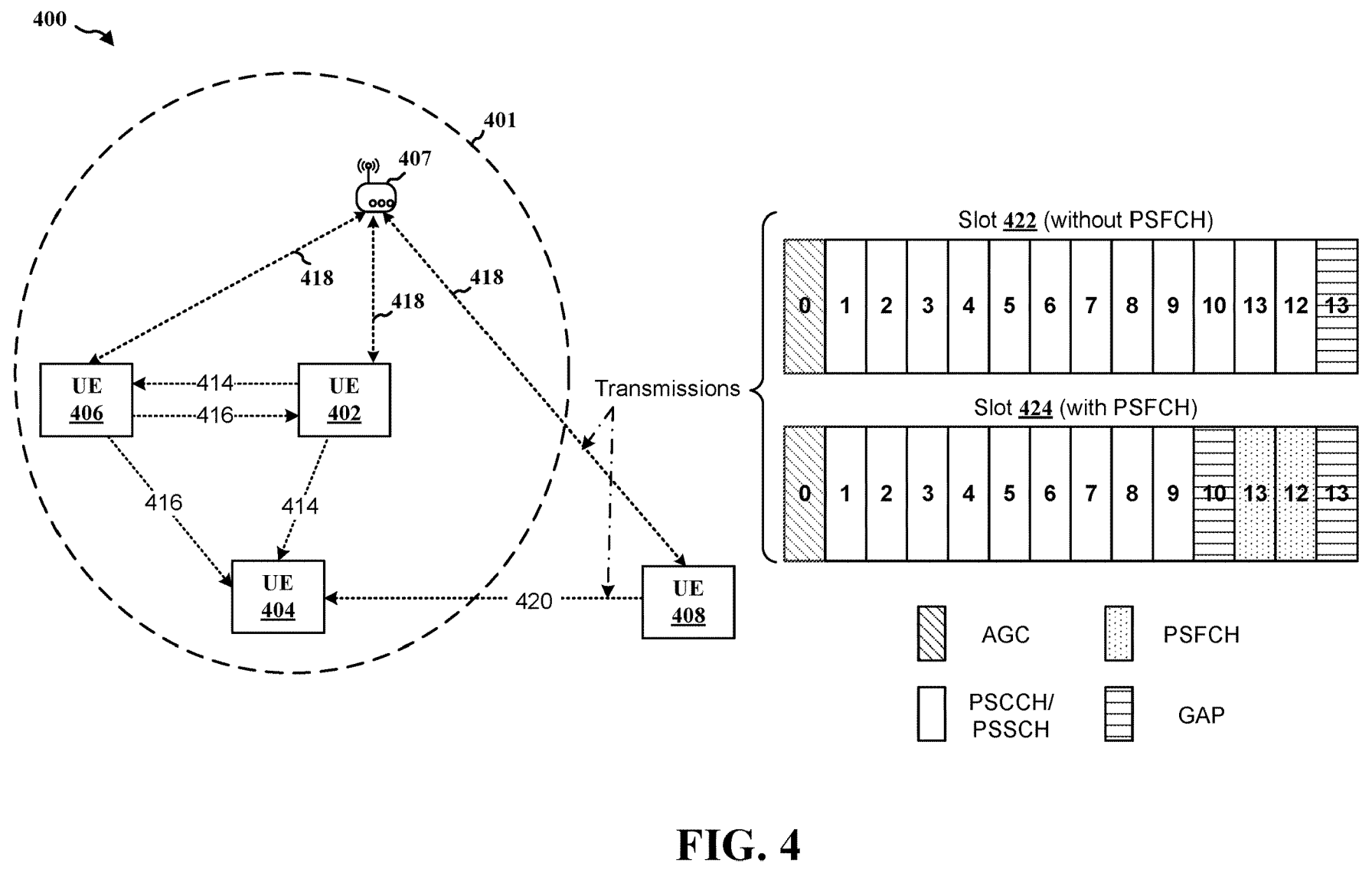

FIG. 4 a diagram 400 illustrating an example of sidelink wireless communication between devices based on sidelink communication. One, non-limiting example of sidelink communication is V2X. Although the aspects are described for a transmitting device and a receiving device to distinguish between the two devices, both devices may be capable of transmission and reception. Although example aspects are described for UEs in order to illustrate the concept, the aspects may be applied by other sidelink devices, as well, such as a road side unit (RSU), etc. A transmitting UE 402 may transmit a transmission 414, e.g., comprising a control channel and/or a corresponding data channel, that may be received by receiving UEs 404, 406. The control channel may include information for decoding a data channel and may also be used by receiving device to avoid interference by refraining from transmitting on the occupied resources during a data transmission. The number of transmission time intervals (TTIs), as well as the RBs that will be occupied by the data transmission, may be indicated in a control message from the transmitting device. The UEs 402, 404, 406, 408 may each have the capability to operate as a transmitting device in addition to operating as a receiving device. Thus, UEs 406, 408 are illustrated as transmitting transmissions 416 and 420 respectively. The transmissions 414, 416, 420 may be broadcast, multicast, or unicast to nearby devices. For example, UE 402 may transmit communication (e.g., data) for receipt by other UEs within a range 401 of UE 402. Additionally, or alternatively, the RSU 407 may receive communication from and/or transmit communication 418 to UEs 402, 406, 408.

The transmissions 414, 416, 420 and/or the communication 418 may be based on a slot structure. The slot structure may include any of the aspects described in connection with FIG. 2. For example, as shown by a slot 422 and a slot 424, the transmission may be in a unit of slots (e.g., with RRC configured starting and ending symbols), and each slot may include 14 symbols (e.g., symbol #0 to symbol #13). The first symbol (e.g., symbol #0) may be a repetition of the second symbol for AGC purposes, such that the first symbol may also be referred to as an AGC symbol in some examples. After the last symbol (e.g., symbol #12), there may be a one-symbol gap (e.g., symbol #13) to allow a UE to perform time division duplex (TDD) switching. As shown by the slot 422, for a slot without physical sidelink feedback channel (PSFCH) configured (discussed below in connection with FIG. 5), a UE may be configured to use symbols #0 to #12 for physical sidelink control channel (PSCCH) and/or physical sidelink shared channel (PSSCH) transmission, and symbol #13 may be left as a gap. As shown by the slot 424, for a slot with PSFCH configured, a UE may be configured to use symbols #0 to #9 for PSCCH/PSSCH transmission and use symbols #11 and #12 for PSFCH transmission, and symbol #13 may be left as a gap.

When a transmitting device (e.g., a sidelink device, a first UE, a base station, an RSU, etc.) transmits a PSSCH to a receiving device (e.g., a second UE, another sidelink device) over the sidelink, the receiving device may respond with HARQ feedback (e.g., ACK/NACK) corresponding to the received PSSCH through a physical sidelink feedback channel (PSFCH) transmission to the transmitting device. The PSFCH may share a same sidelink resource pool as the PSCCH and the PSSCH, where the receiving device may determine a PSFCH resource for transmitting the HARQ feedback from a configured PSFCH resource pool. The PSFCH may be enabled for unicast and/or groupcast communications. For the unicast communication, a receiving device may transmit a 1-bit ACK/NACK feedback (e.g., 0=NACK, 1=ACK, etc.) to the transmitting device using the PSFCH to indicate whether the transmitting device has successfully decoded a received PSSCH. For the groupcast communication, a receiving device may transmit the HARQ feedback in one of two feedback modes via the PSFCH. In a first feedback mode, the receiving device may transmit negative feedback (e.g., NACK) to the transmitting device when the receiving device fails to decode a received PSSCH, and the receiving device may skip transmitting positive feedback (e.g., ACK) to the transmitting device when the receiving device successfully decodes a received PSSCH. The first mode may be referred to as NACK based feedback or NACK only feedback. In a second mode, the receiving device may transmit a positive feedback to the transmitting device when the receiving device successfully decodes a received PSSCH, and the receiving device may transmit a negative feedback to the transmitting device when the receiving device fails to decode a received PSSCH.

Figure 5:
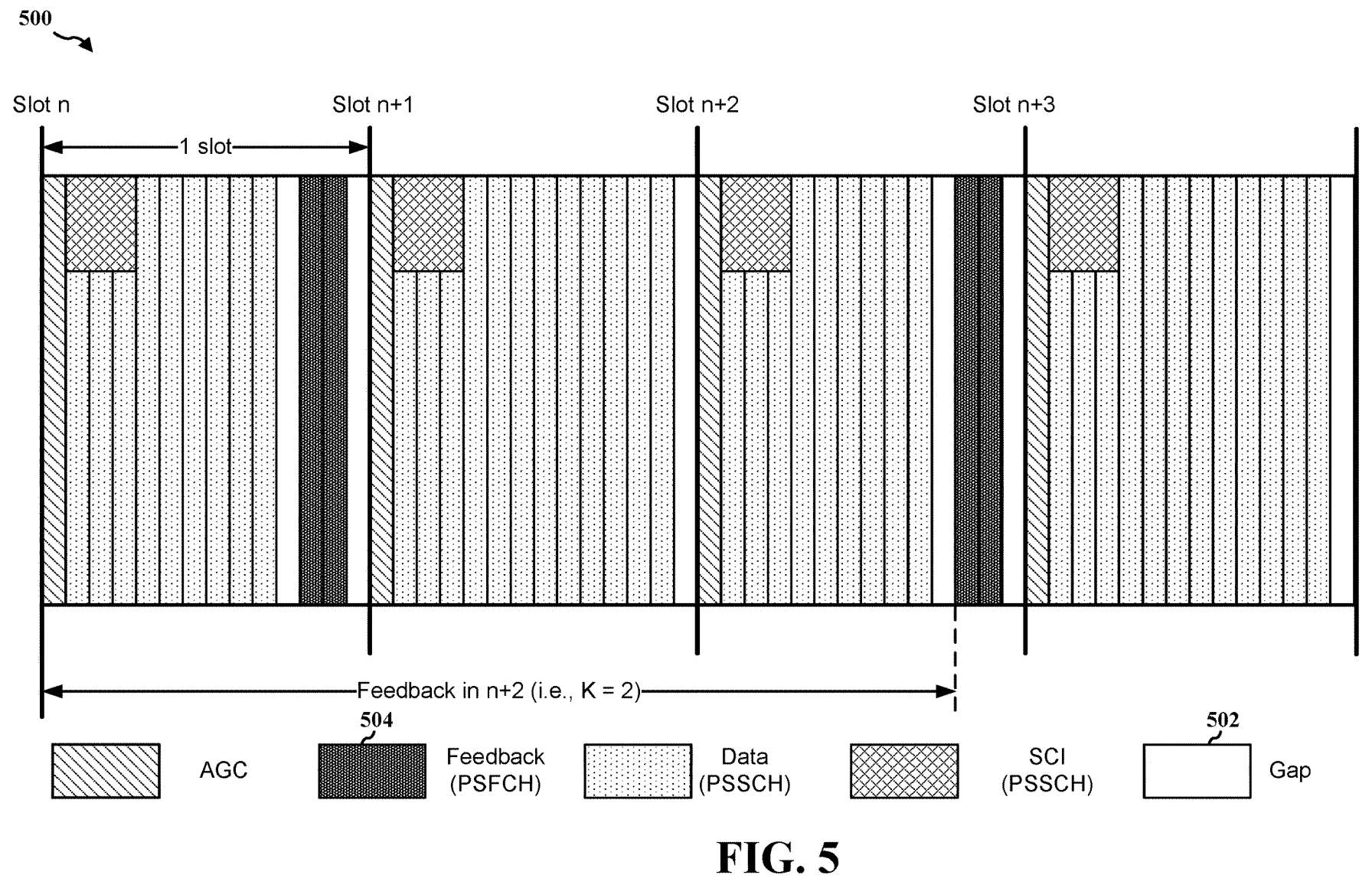

FIG. 5 is a diagram 500 illustrating an example PSFCH configuration. The PSFCH resources (e.g., a PSFCH resource pool) may be periodic system-wide feedback resources that are configured (e.g., loaded on a sidelink device) or configured by a network (e.g., by a base station). The PSFCH resources may also be configured with a periodicity N which may indicate how often the PSFCH resources are being configured in a sidelink resource pool. For example, the periodicity N may be 1, 2, or 4 slots. If N=1 slot, it may indicate that the PSFCH resources are configured (e.g., available) in every slot within the sidelink resource pool, and if N=2, such as illustrated by diagram 500, it may indicate that the PSFCH resources are configured in every two slots within the sidelink resource pool, etc. In one example, as shown by diagram 500, when the PSFCH resources are configured for a slot, the PSFCH resources may occupy three OFDM symbols within the slot, where one symbol may be used for a gap 502 and two symbols may be used for the PSFCH 504. For example, the gap 502 may use a symbol prior to and/or after the PSFCH 504, and the gap 502 may be used by the sidelink device for turnaround between reception of data and transmission of the HARQ feedback. The number of physical resource blocks (PRBs) used for the PSFCH may be configured, such as by a bitmap. For example, in one of PUCCH formats (e.g., Format 0), there may be one resource block (RB) carrying HARQ-ACK information for a single PSSCH transmission, where the PSFCH format 0 sequence may be repeated on 2 PSFCH symbols. There may also be a timing gap K configured for the PSFCH resources, where the timing gap may indicate a duration between a slot carrying a PSSCH and a corresponding slot that is configured with the PSFCH resources for providing the HARQ feedback for the PSSCH. Thus, when a receiving device receives a PSSCH in slot n, the receiving device may transmit corresponding HARQ feedback through a PSFCH resources in slot (n+K). For example, as shown by diagram 500, if the timing gap K=2, then a sidelink device receiving a PSSCH at slot n may transmit the corresponding HARQ feedback using the PSSCH resources within the slot n+2.

A sidelink device (e.g., the UEs 402, 406, 406, 408, the RSU 407, or other device that communicates based on sidelink) may communicate with another sidelink device based on a broadcast mode, a groupcast mode and/or a unicast mode. For a communication under the groupcast (or multicast) mode, the communication may further be a connectionless groupcast or a managed groupcast.

Figures 6A, 6B, 6C, 6D:
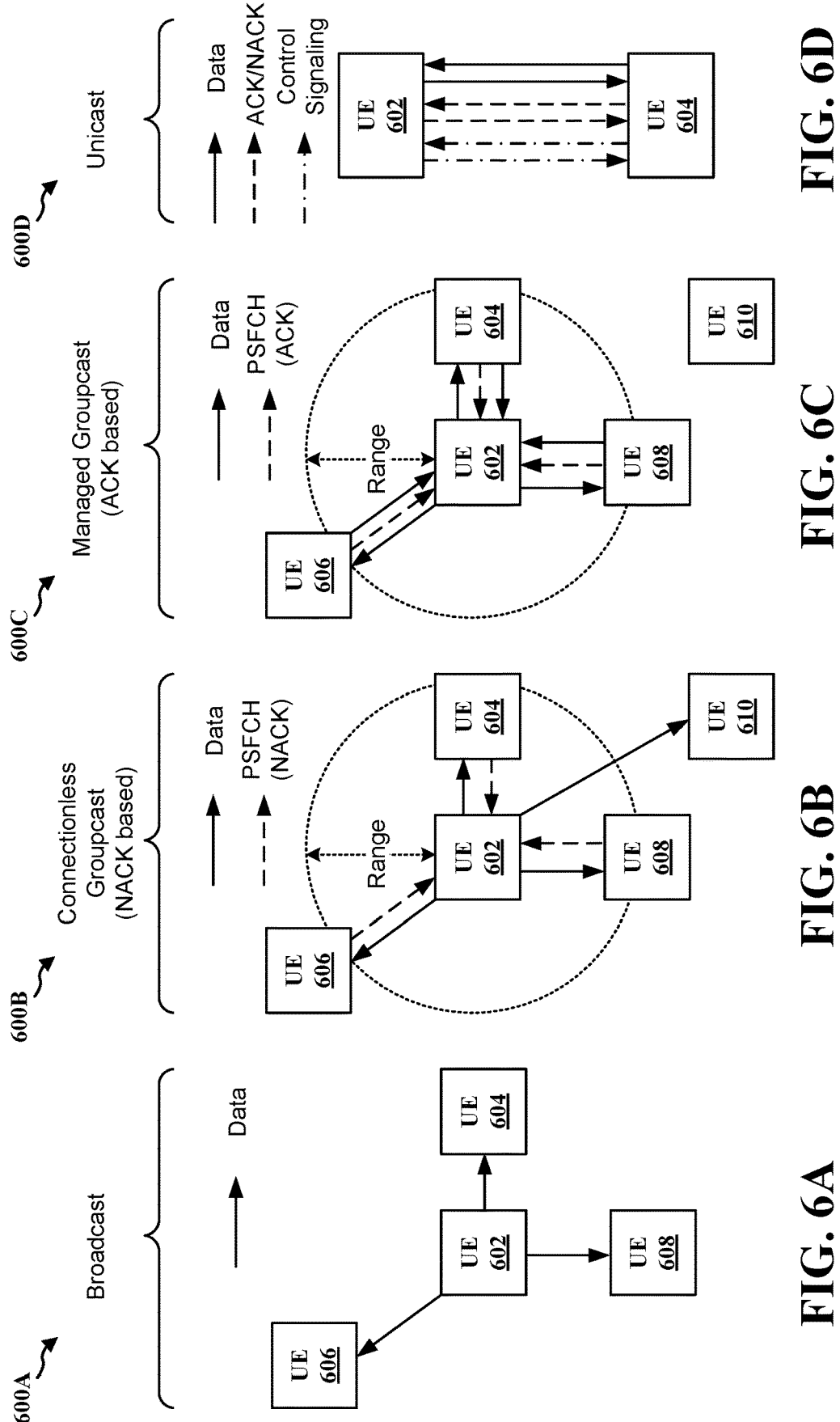
FIG. 6A is a diagram illustrating an example sidelink communication based on broadcast mode.
FIG. 6B is a diagram illustrating an example sidelink communication based on connectionless groupcast mode.
FIG. 6C is a diagram illustrating an example sidelink communication based on managed groupcast mode.
FIG. 6D is a diagram illustrating an example sidelink communication based on unicast mode.

FIG. 6A is a diagram 600A illustrating an example of sidelink communication based on a broadcast mode. Under the broadcast mode, a transmitting UE 602 may transmit data (e.g., PSSCH) to one or more receiving UEs, such as UEs 604, 606 and 608, within its transmission range, but the UE 602 may not expect to receive any response from the receiving UEs. For example, the UE 602 may transmit sidelink data without monitoring for, or without receiving, feedback for the data transmission.

FIG. 6B is a diagram 600B illustrating an example of sidelink communication based on a connectionless groupcast mode (e.g., the first mode). Under the connectionless groupcast mode, a transmitting UE 602 may transmit data (e.g., PSSCH) to one or more receiving UEs, such as UEs 604, 606, 608 and 610, within its transmission range. The receiving UE(s) may transmit feedback to the UE 602. For example, a receiving UE may transmit a NACK to the transmitting UE 602 if the receiving UE fails to decode/receive the data, and the receiving UE may skip transmitting an ACK to the transmitting UE 602 if the receiving UE successfully decodes the received data.

If the receiving UE is outside of the transmitting UE's reception range, such as the UE 610, the transmitting UE 602 may not receive feedback. For example, a UE that does not successfully decode the transmission may not send a NACK if the receiving UE is outside of the range. Similarly, the UE 602 may not receive an ACK from the receiving UE that is outside of the range if the receiving UE successfully decodes the data.

FIG. 6C is a diagram 600C illustrating an example of sidelink communication based on a managed groupcast mode (e.g., the second mode). Under the managed groupcast mode, a transmitting UE 602 may communicate with (e.g., transmit data to and/or receive data from) a subset of UEs in its vicinity/range, such as UEs 604, 606 and 608. Then, a receiving UE may transmit an ACK to the transmitting UE 602 if the receiving UE successfully decodes a data (e.g., PSSCH) received from the transmitting UE 602, and the receiving UE may transmit a NACK to the transmitting UE 602 if the receiving UE fails to decode/receive the data. If the receiving UE is outside of the transmitting UE's transmission and/or reception range, such as a UE 610, the transmitting UE 602 may not communicate with the receiving UE. Thus, similar to FIG. 6B, the transmitting UE 602 may not expect to receive feedback from UEs outside of the range, and UEs that are outside of the range (e.g., UE 610) may refrain from transmitting feedback for the data transmission.

FIG. 6D is a diagram 600D illustrating an example of sidelink communication based on a unicast mode. Under the unicast mode, a sidelink UE 602 may establish a unicast link (e.g., a PC5 connection) with another sidelink UE 604, such that the sidelink UE 602 and the sidelink UE 604 may transmit data, HARQ feedback (e.g., ACK/NACK) and/or control signals (e.g., PC5-S, PC5-RRC, sidelink CSI, etc.) that is directed to each other.

Figure 7B:
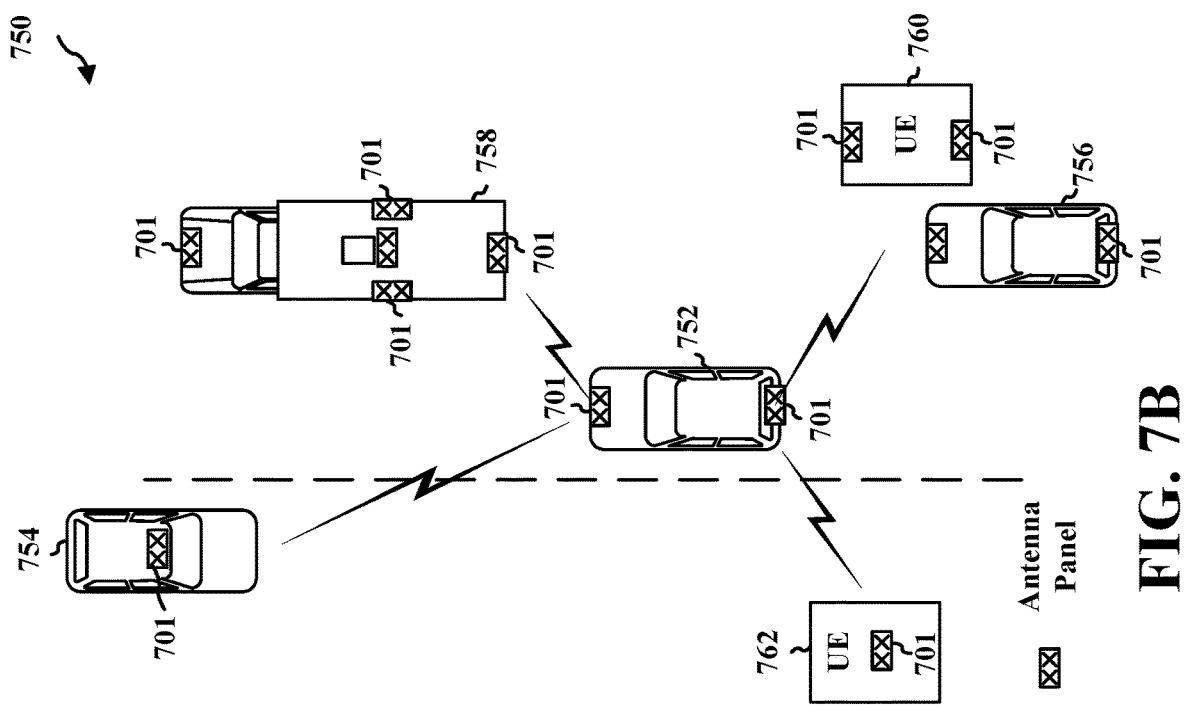
FIGS. 7A and 7B are diagrams illustrating examples of sidelink devices with multi-TRPs.
Figure 7A:
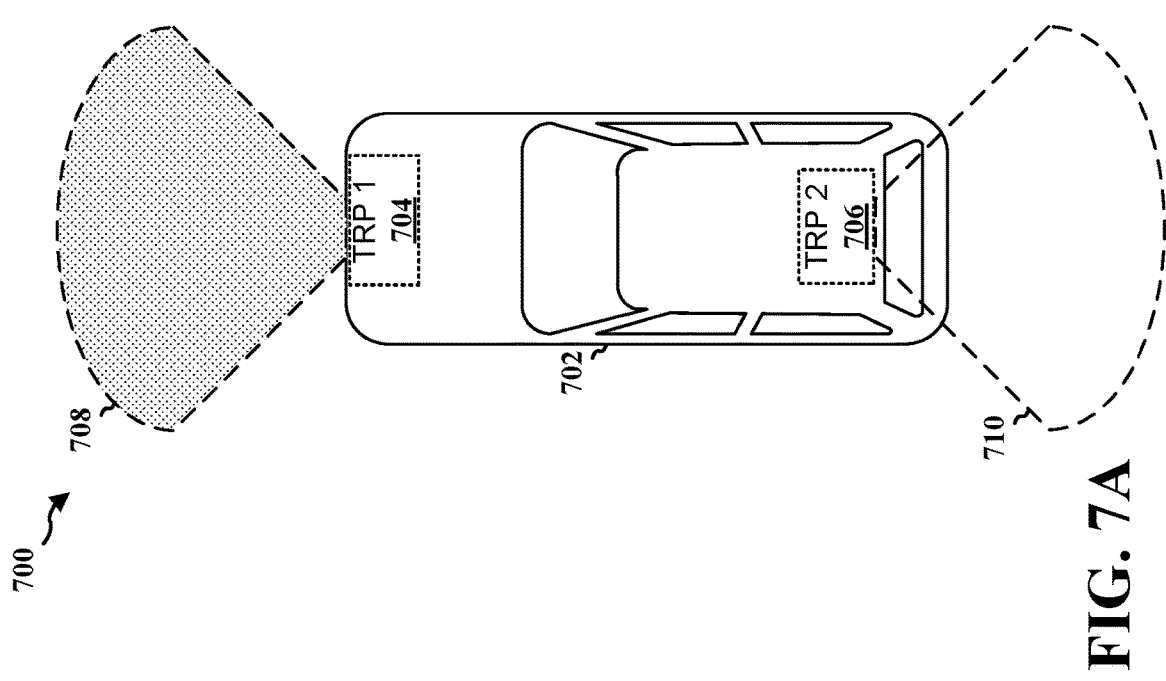

In order to improve coverage for sidelink communication, a sidelink device may include multiple transmission reception points (TRPs), and the sidelink device may communicate with other sidelink device(s) through one or more of the TRPs. Although this example shows a vehicle sidelink application for sidelink devices associated with a vehicle in order to illustrate the concept of multiple TRP sidelink communication, the aspects presented herein are not limited to vehicle applications or to V2X and may be applied by any sidelink device having multiple TRPs. FIG. 7A is a diagram 700 illustrating an example sidelink device with multiple TRPs (multi-TRPs). As one non-limiting example, a sidelink device 702 may include a first TRP 704 at the front and a second TRP 706 at the rear. Note the sidelink device 702 is merely one example, other sidelink devices may have two or more TRPs locating at different locations/parts. FIG. 7B is a diagram 750 showing an example with sidelink devices 752, 756, and 760 having two TRPs 701, e.g., a front antenna panel and a rear antenna panel. FIG. 7B also illustrates a UE 758 associated a larger vehicle having more than two TRPs 701, as well as UEs 754 and 762 having a single TRP 701. The multi-TRPS configuration may improve reliability, coverage, and/or capacity performance of sidelink communication by enabling more flexible deployment of TRPs or antennas for sidelink devices. For example, from transmission's point of view, coverage for data transmission from a TRP may be biased based on the location of the TRP. As shown by diagram 700 in FIG. 7A, the first TRP 704 of the sidelink device 702 may provide better coverage or transmission for a front area of the sidelink device 702, such as shown by 708, whereas the second TRP 706 may provide better coverage or transmission for a rear area of the sidelink device 702, such shown by 710. Thus, the sidelink device 702 may use the first TRP 704 for transmitting data to sidelink device(s) in front of the sidelink device 702 and use the second TRP 706 for transmitting data to sidelink device(s) at the rear of the sidelink device 702 to improve reliability of the sidelink communication, such as the safety and other high robustness applications of the automobile (e.g., collision alert application, auto-driving application, etc.). In some examples, side coverage may be less significant for a transmitting device, and the coverage area of a TRP may vary based on data (e.g., packet) content and/or type. In another example, from a reception's point of view, the sidelink device 702 may improve data reception by using multi-TRPs which may provide, e.g., 360-degree coverage, where the sidelink device 702 may receive data from one or more sidelink devices using multiple TRPs. For example, the sidelink device 702 may receive data from another UE using both the first TRP 704 and the second TRP 706 to increase the likelihood that the data is successfully received.

Figure 8:
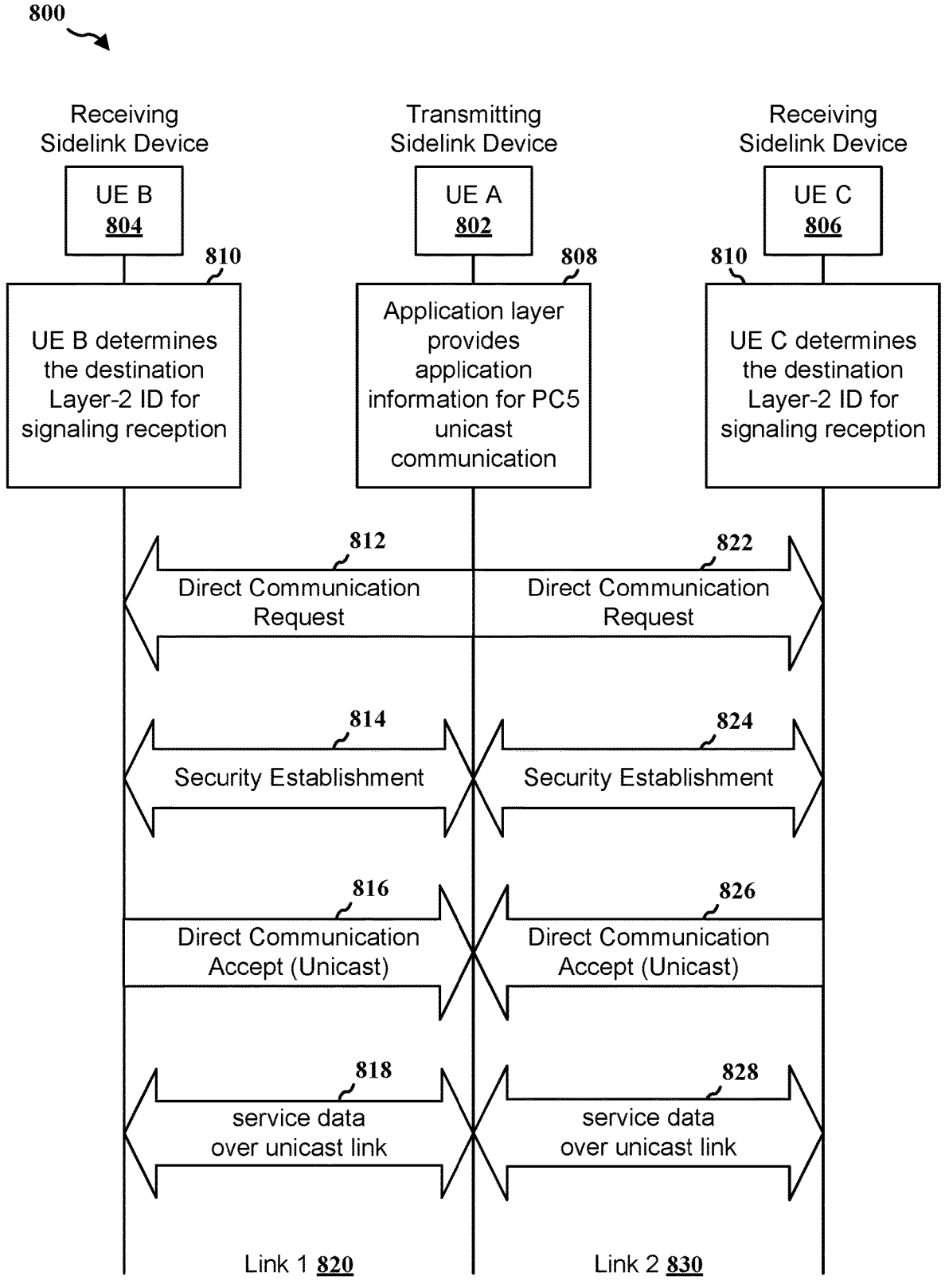
FIG. 8 is a diagram illustrating an example link establishment procedure for multiple unicast links.

A sidelink device, such as a UE or other device communicating based on sidelink, may establish multiple unicast (e.g., PC5) links with multiple sidelink devices. Although the aspects of FIG. 8 are described for UEs to illustrate the concept, the aspects may similarly be applied for other devices communicating based on sidelink, such as an RSU or other sidelink device. In some examples, the sidelink UE may establish multiple unicast links using multiple TRPs, where a sidelink UE may communicate with other sidelink UEs over multiple unicast links through one or more TRPs of the sidelink UE. FIG. 8 is a diagram 800 illustrating an example unicast link (e.g., a Layer-2 link) establishment procedure for establishing multiple unicast links with multiple sidelink UEs. At 808, a transmitting UE 802's sidelink application layer (e.g., a V2X application layer) may provide the transmitting UE 802 with application information for establishing unicast communication with one or more receiving UEs. At 810, a receiving UE 804 and a receiving UE 806 may determine a destination Layer-2 ID for signaling reception. At 812, the transmitting UE 802 may transmit a unicast connection request to the receiving UE 804. At 814, the receiving UE 804 and the transmitting UE 802 may establish a security context for the unicast connection, such as based on one or more parameters of the receiving UE 804. At 816, the receiving UE 804 may send a message indicating an acceptance of the request to establish the unicast connection over the sidelink. At 818, after the transmitting UE 802 receives the acceptance for the unicast connection request, a unicast link 820 may be established between the transmitting UE 802 and the receiving UE 804. The transmitting UE 802 and the receiving UE 804 may then transmit or receive data over the sidelink using the established unicast link 820. Similarly, the transmitting UE 802 may establish another unicast link with the receiving UE 806. For example, at 822, the transmitting UE 802 may transmit a unicast connection request to the receiving UE 806. At 824, the receiving UE 806 and the transmitting UE 802 may establish a security context for the unicast connection, such as based on one or more parameters of the receiving UE 806. At 826, the receiving UE 806 may send a message indicating an acceptance of the request to establish the unicast connection over the sidelink. At 828, after the transmitting UE 802 receives the acceptance for the unicast connection request, a unicast link 830 may be established between the transmitting UE 802 and the receiving UE 806. The transmitting UE 802 and the receiving UE 806 may then transmit or receive data over the sidelink using the established unicast link 830. As such, after the transmitting UE 802 establishes both unicast link 820 and unicast link 830 with the first receiving UE 804 and the second receiving UE 806 respectively, the transmitting UE 802 may communicate (e.g., transmits/receives sidelink service data such as V2X service data) with the receiving UE 804 and the receiving UE 806 separately in their dedicated unicast links 820 and 830 respectively.

Sidelink communication that is exchanged directly between sidelink UEs may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. The sidelink transmission and/or the resource reservation may be periodic or aperiodic, where a UE may reserve resources for transmission in a current slot and up to two future slots (discussed below). These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

Figure 9:
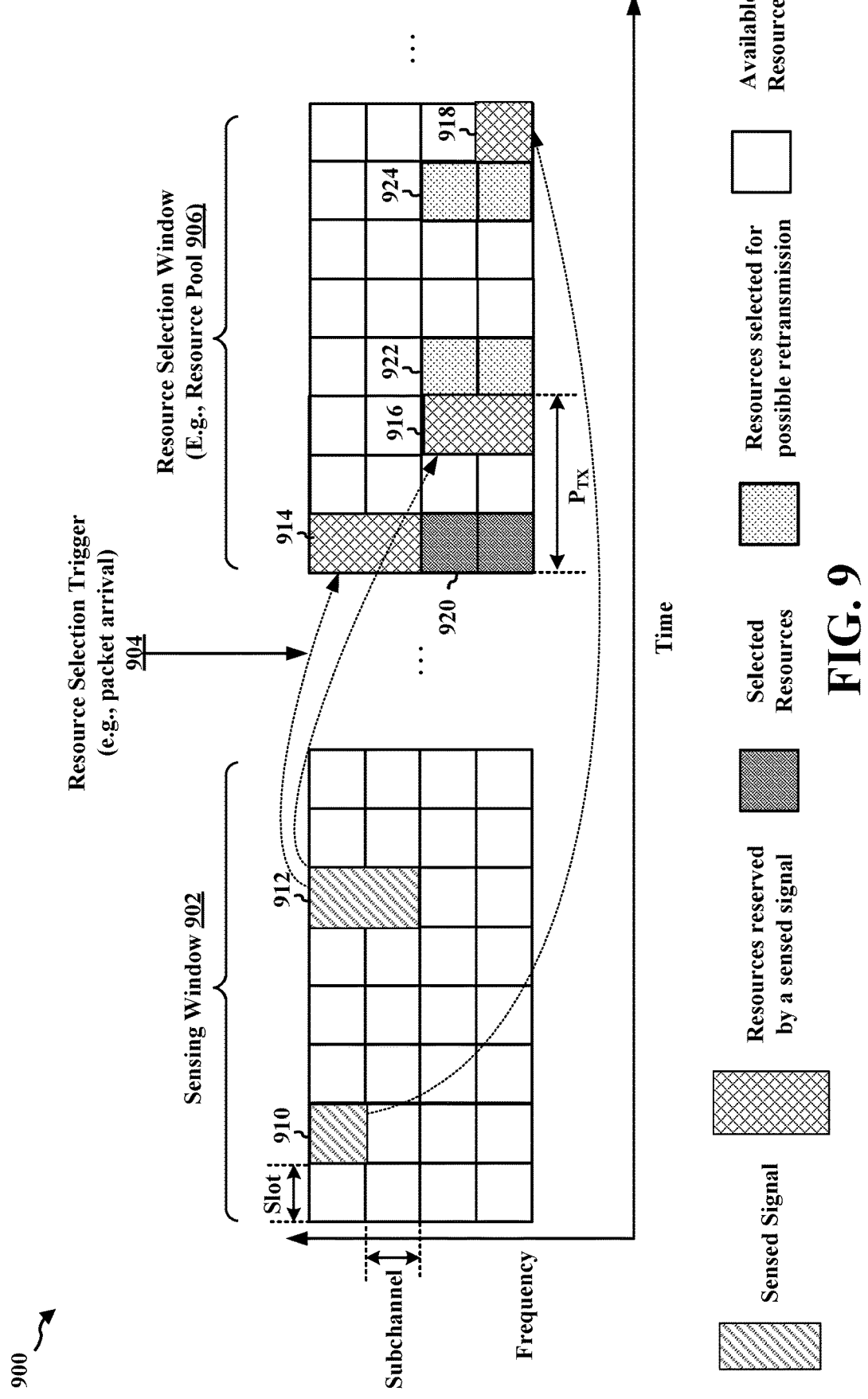
FIG. 9 illustrates an example of resource allocation based on sensing.

FIG. 9 illustrates an example of resource allocation based on sensing 900. The UE may perform sensing by monitoring for sidelink control information (SCI) indicating resources that the other UEs use or reserve for transmitting sidelink transmissions. The SCI indicating resources may be described as reserving the sidelink resources. The indicated resources may be referred to as a sidelink reservation. The UE may monitor a set of frequency resources over a window of time, as shown at 902 in FIG. 9. The frequency range may be based on a set of resources for sidelink communication. The time and frequency resources for sidelink communication may be referred to as a resource pool, such as shown by a resource pool 906 in FIG. 9. In other words, a resource pool may be a collection of time/frequency resources on which sidelink communication may occur. The UE may determine the available resources in the resource pool based on the remaining resources that are not reserved. For example, in Mode 2 resource allocation, a UE which is configured to transmit a packet may perform the sensing (i.e., monitor the activity in a communication resource pool), and the UE may determine if a resource in a future slot is reserved by another UE in a past slot. The UE may use a resource if the resource is not reserved by another UE to transmit a packet. For example, after the occurrence of a resource selection trigger, at 904, such as the UE having a data for sidelink transmission, the UE may select resources for transmission from the available resources in the resource pool 906 that are not reserved by SCI received during the sensing window 902. The resource selection may be triggered, by the UE having data for transmission, for example. The resource pool 906 may be preconfigured (i.e., preloaded) on a UE or configured by a base station.

FIG. 9 illustrates that sidelink transmission 910 indicates a resource reservation for resource 918, and sidelink transmission 912 indicates a resource reservation for resources 914 and 922. For example, the sidelink transmissions 910 and 912 may each include SCI that indicates the corresponding resource reservation.

A UE receiving the transmissions 910 and 912 may exclude the resources 914, 916, and 918 as candidate resources in a candidate resource set based on the resource pool 906. In some examples, the UE may exclude the resources 914, 916, or 918 based on whether a measured RSRP for the received SCI (e.g., in 910 or 912) meets a threshold. The UE may select resources for the sidelink transmission (e.g., including PSCCH and/or PSSCH) from the remaining resources of the resource pool within the resource pool 906 after the exclusion of the reserved resources (e.g., 914, 916, and 918). FIG. 9 illustrates an example in which the UE selects the resource 920 for sidelink transmission. The UE may also select resources 922 and/or 924 for a possible retransmission. After selecting the resources for transmission, the UE may transmit SCI indicating a reservation of the selected resources. Thus, each UE may use the sensing/reservation procedure to select resources for sidelink transmissions from the available candidate resources that have not been reserved by other UEs.

The sidelink resource reservation may be periodic or aperiodic. For example, a UE may periodically reserve resources, such as by indicating a reservation period in an SCI. Thus, when the periodic resource reservation is enabled, the reservations in the SCI may be repeated with the signalled period. In some examples, the UE may indicate the resource reservation in multiple SCI parts. For example, the UE may transmit a first part of the reservation in a physical sidelink control channel (PSCCH) region, and may transmit a second part of the reservation in a physical sidelink shared channel (PSSCH) region. For an example, a first stage control (e.g., SCI-1) may be transmitted on a PSCCH and contain resource allocation and information related to the decoding of a second stage control (e.g., SCI-2), and the second stage control may be transmitted on a PSSCH and contain information for decoding data (SCH). Therefore, multiple resources may be indicated, or reserved, through a combination of the first SCI part indicated in the PSCCH region and the second SCI part in the PSSCH region. For example, the first SCI part in the PSCCH may reserve resources for a UE in a PSSCH, and the first SCI part may also indicate to a receiving UE that there is a second SCI part or more (e.g., Two-stage SCI) in the PSSCH. The second SCI part may reserve other resources or provide signalling and/or information to the UE which may be unrelated to the resources reserved in the first SCI part.

Figure 10:
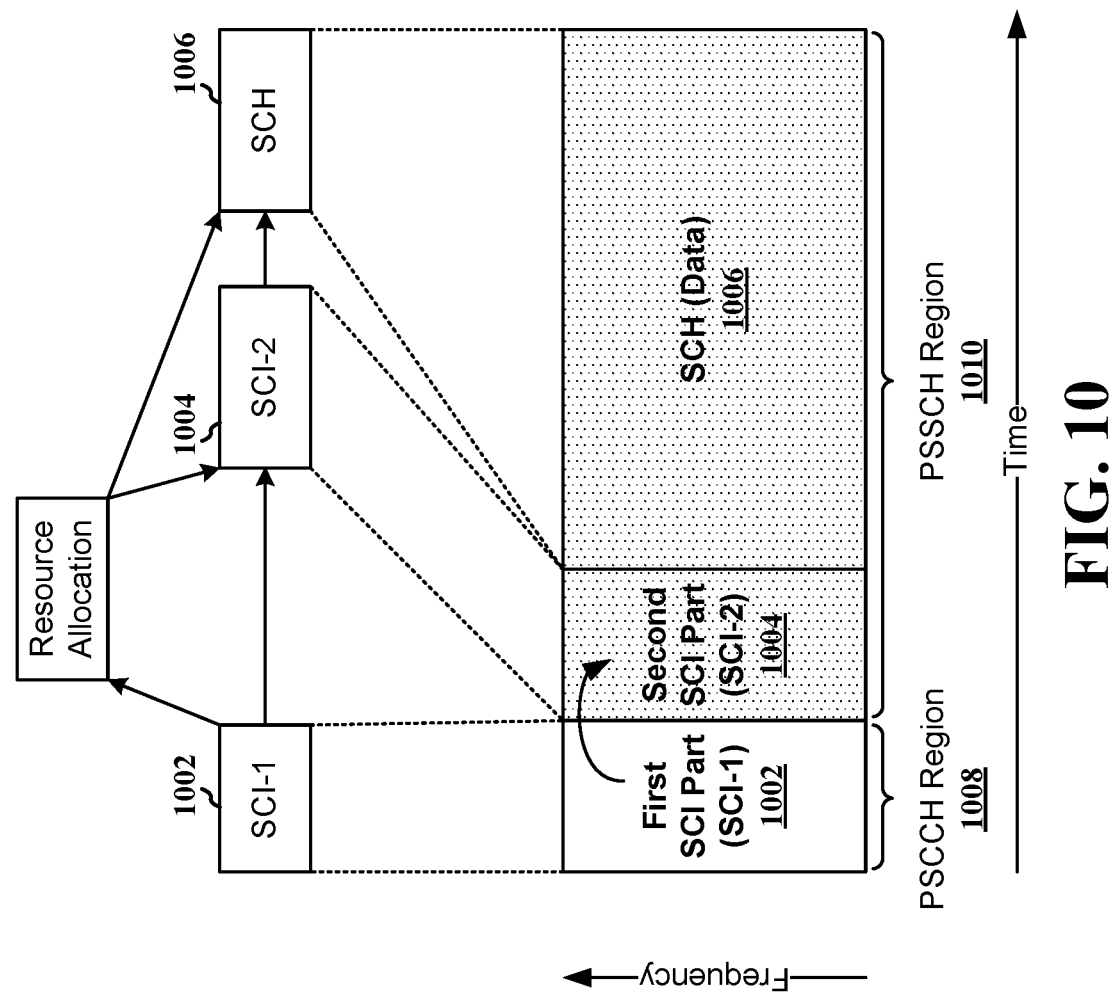
FIG. 10 is a diagram illustrating an example of two-stage PSCCH.

FIG. 10 is a diagram 1000 illustrating an example of a two-stage PSCCH. To reduce control overhead and to improve the processing timeline, SCI used for sidelink grant(s) may split into two parts or more. A first SCI part 1002 may be transmitted within the control region (e.g., the PSCCH region 1008) and a second SCI part 1004 may be transmitted within the downlink traffic region (e.g., the PSSCH region 1010). The PSCCH region 1008 and the PSSCH region 1010 may together form one slot. The first SCI part 1002 may include initial control information regarding a sidelink transmission, such as the resource assignment (RA) in SCH 1006 or other resource reservation information, rank and modulation order of the sidelink assignment, etc. In addition, the first SCI part 1002 may also include control information about the second SCI part 1004. In some examples, the control information may indicate the number of resource elements (size) and code rate of the second SCI part 1004. The control information may further indicate the location (e.g., starting resource element) and code rate of the second SCI part 1004. In other examples, the PSCCH region 1008 may be limited to a single sub-channel, and a transmitting UE may apply a frequency domain orthogonal cover code (FD-OCC) to DMRS to reduce impact of colliding PSCCH transmissions, where the transmitting UE may randomly select the FD-OCC from a set of pre-defined FD-OCCs. The second SCI part 1004 may include the remaining control information regarding the sidelink assignment. For example, the remaining control information may include non-time critical control information or other resource allocation for data transmission in SCH 1006, such as the source and destination ID for the data transmission. In one aspect, a the first SCI part 1002 (e.g., SCI-1) format may include one or more of followings: a priority (QoS value), a PSSCH resource assignment (e.g., frequency/time re source for PSSCH), a resource reservation period (e.g., if enabled), a PSSCH DMRS pattern (e.g., if more than one patterns are configured), a second SCI format (e.g. information on the size of the second SCI), a 2-bit beta offset for second stage control resource allocation, number of PSSCH DMRS port(s) (e.g., 1 or 2), a 5-bit MCS and/or one or more reserved bits, etc.

Figure 11:
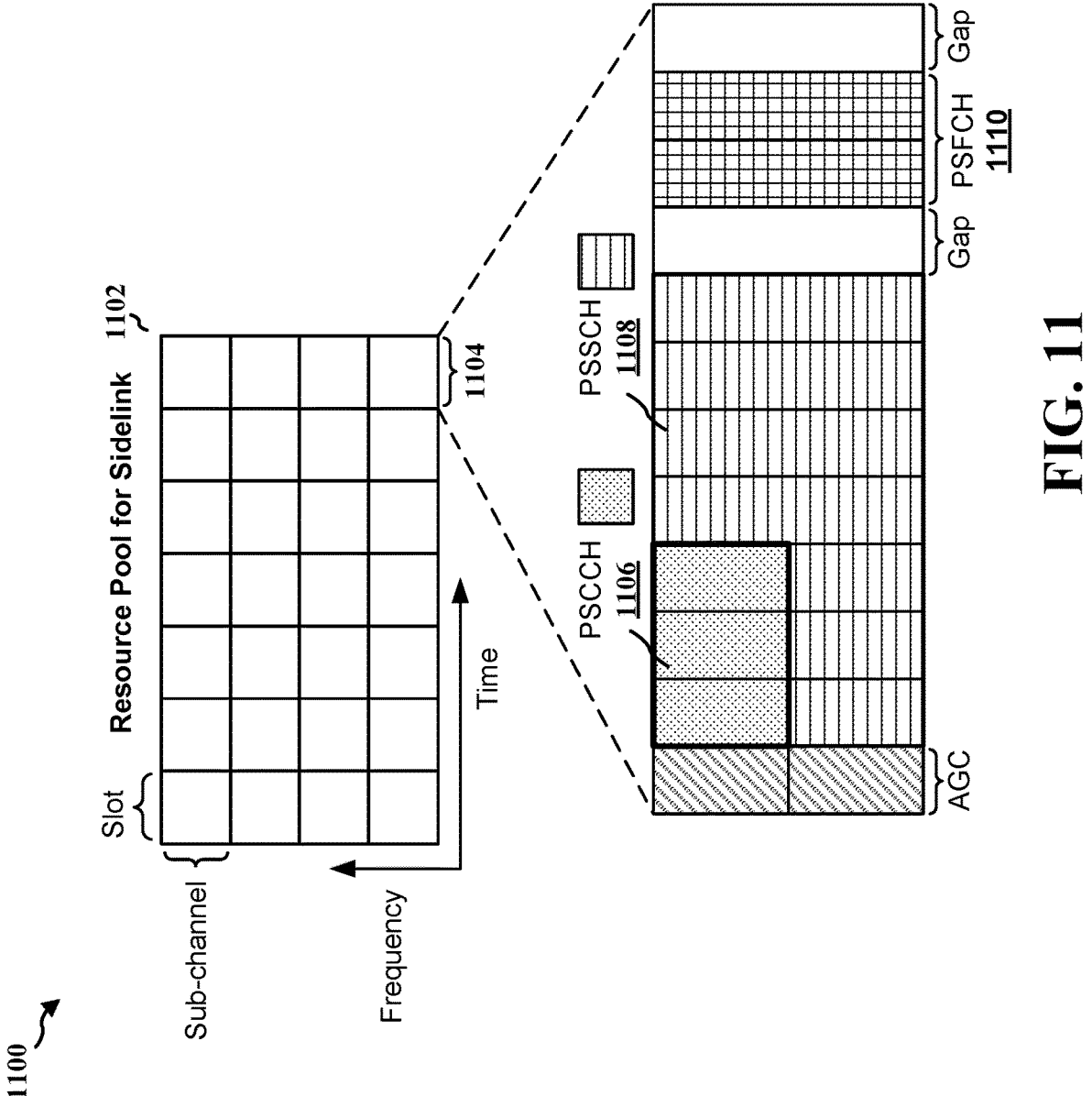
FIG. 11 is a diagram illustrating an example physical channel structure of a sidelink slot within a sidelink resource pool.

FIG. 11 is a diagram 1100 illustrating an example physical channel structure of a sidelink slot 1104 within a sidelink resource pool 1102, where the sidelink slot 1104 is configured with PSFCH 1110. After a sidelink UE receives the sidelink slot 1104, the sidelink UE may first decode SCI in PSCCH 1106 (e.g., the SCI-1), then decode SCI in PSSCH 1108 (e.g., the SCI-2) if there is a two-stage PSCCH, then decode data in the PSSCH 1108, and then decode the HARQ feedback in the PSFCH 1110 based on the cast type (e.g., unicast, groupcast, broadcast) and feedback mode (e.g., NACK only or ACK/NACK).

As described in connection with FIG. 8, a sidelink UE may maintain multiple unicast links (e.g., PC5 links) with one or more peer UEs, e.g., the transmitting UE 802 may established the unicast link 820 with the receiving UE 804 and the unicast link 830 with the receiving UE 806 as depicted in FIG. 8. For sidelink communication involving multiple unicast links, to make effective use of sidelink resources or to increase/improve sidelink bandwidth, a transmitting UE may apply space-division multiplexing (SDM) to transmissions and/or receptions from the multiple unicast links. The SDM, which may also be referred to as spatial multiplexing, is a multiplexing technique that may be used in MIMO wireless communication and/or other communications technologies to transmit different channels separately in space. For example, when multiple antennas are used by a transmitting device and a receiving device, multiple streams/signals may be sent with different information using SDM to increase user data bit rate. The transmitting device may transmit data using several spatial layers with small phase shift between the spatial layers to enabling the receiving device to decode the spatial layers separately.

Figure 12:
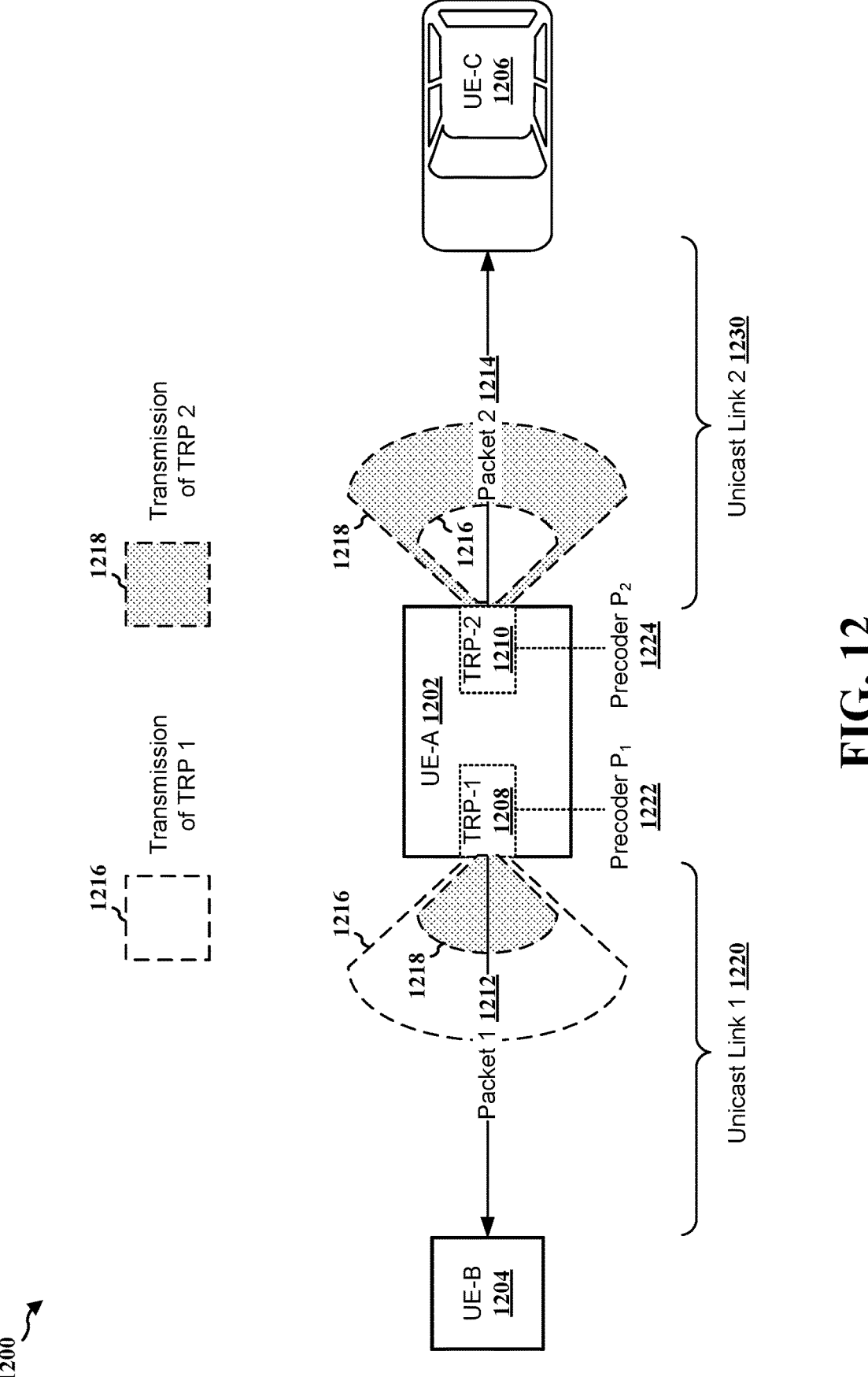
FIG. 12 is a diagram 1200 illustrating an example SDM transmission from a UE with multiple TRPs according to aspects of the present disclosure.

FIG. 12 is a diagram 1200 illustrating an example SDM transmission from a UE with multiple TRPs according to aspects of the present disclosure. A transmitting UE 1202 (e.g., a sidelink device, an automobile, an RSU, etc.) may include a first TRP 1208 that has a transmission coverage 1216. The transmission coverage 1216 may be larger/broader on the first TRP 1208's side/direction (e.g., front of an automobile or a mobile device), and may be smaller/narrower on the other side/direction (e.g., rear of the automobile or the mobile device) of the transmitting UE 1202. The transmitting UE 1202 may also include a second TRP 1210 that has a transmission coverage 1218. Similarly, the transmission coverage 1218 may be larger/broader on the second TRP 1210's side/direction, and may be smaller/narrower on the other side/direction of the sidelink UE 1202.

As described in connection with FIG. 8, the transmitting UE 1202 may establish a first unicast link 1220 with a first receiving UE 1204 and a second unicast link 1230 with a second receiving UE 1206, such that the transmitting UE 1202 may communicate with both receiving UEs over the sidelink. When the transmitting UE 1202 is to transmit a first packet 1212 to the first receiving UE 1204 and a second packet 1214 to the second receiving UE 1206, to make effective use of the sidelink resources, the transmitting UE 1202 may apply SDM to the transmission of the first packet 1212 and the transmission of the second packet 1214 by transmitting the different packets from different TRPs so that the transmitting UE 1202 may transmit the first packet 1212 and the second packet using same frequency and time resources. For example, the transmitting UE 1202 may apply a first precoder 1222 that is associated with a first spatial layer of an SDM transmission to the first unicast link 1220 to transmit the first packet to UE 1204, and the transmitting UE 1202 may apply a second precoder 1224 that is associated with a second spatial layer of the SDM transmission to the second unicast link 1230 to UE 1206. The transmitting UE 1202 may transmit the first packet 1212 from the first TRP 1208 to the UE 1204 using the first precoder 1222 and may transmit the second packet 1214 from the second TRP 1208 to the UE 1206 using the second precoder 1222. As the first unicast link 1220 and the second unicast link 1230 are mapped to different spatial layers (e.g., streams with different phase shift), the UE 1202 may transmit the first packet 1212 to the first receiving UE 1204 and the second packet 1214 to the second receiving UE 1206 using the same time-frequency resources. In one example, the transmitting UE 1202 may enable the SDM transmission with multiple receiving UEs in multiple unicast links, such as the receiving UEs 1204 and 1206, based on interference measurement between the transmitting UE 1202 and the receiving UEs. In other words, for unicast, to make effective use of V2X resource and to enable reliable SDM reception, a transmitting UE may enable SDM transmission with multiple unicast receiver UEs, in view of e.g., V2X service type and/or directional transmission characteristics with multi-TRPs.

Aspects presented herein may enable a transmitting UE (e.g., a sidelink device) to determine whether, or when, to enable SDM transmission for multiple unicast links. Aspects presented herein may provide improved measurement procedure(s) of SDM transmission determination for unicast transmitting UE and receiving UEs (e.g., UEs that are communicating under the unicast mode). In addition, aspects presented herein may enable a transmitting UE to determine precoders for different TRPs of the transmitting UE for SDM transmission. For example, a transmitting UE may transmit a first packet to a first receiving UE with a first precoder $P_1$ and a second packet to a second receiving UE with a second precoder $P_2$, where $Y_{2+1}=H_{2\times2}P_{2\times2}X_{2\times1}$, $P=[P_1\ P_2]$. As such, the first packet may be transmitted through a first spatial layer (e.g., layer 0) that may be mapped to antenna port zero (0), and the second packet may be transmitted through a second spatial layer (e.g., layer 1) that may be mapped to antenna port one (1). Aspects presented herein may also provide improved allocation of control signals for SDM transmission when SDM transmission is enabled over multiple unicast links.

A transmitting sidelink device may be able to measure the channel condition of a sidelink channel by configuring or transmitting reference signal (RS) to a receiving sidelink device via the sidelink channel. For example, the sidelink device may transmit channel state information reference signal (CSI-RS) that includes channel measurement resource (CMR or CMR resource) to the receiving sidelink device via the sidelink channel. In response, the receiving sidelink device may measure the sidelink channel quality based on the CSI-RS, such as by measuring the reference signal received power (RSRP) and/or received signal strength indicator (RSSI) of the CSI-RS or the CMR of the CSI-RS. Then, the receiving sidelink device may report the sidelink channel measurement to the transmitting sidelink device, such as via CSI reporting/feedback. In some examples, a receiving sidelink device may also measure the interference level of a sidelink channel based on the one or more reference signals. For example, the CSI-RS may optionally or additionally be configured with interference measurement resource (IMR or IMR resource) which may enable the sidelink device to perform interference measurements for the sidelink channel, such as by measuring the interference/power level of the IMR. Similarly, the receiving sidelink device may report the sidelink interference measurement to the transmitting sidelink device, such as via CSI reporting/feedback.

In one aspect of the present disclosure, a sidelink device may determine whether to apply SDM transmission for multiple unicast links based at least in part on the channel measurement (e.g., CMR measurement) and the interference measurement (e.g., IMR measurement) of the multiple unicast links. For example, a transmitting sidelink device may configure multi-port CSI-RS with CMR and/or IMR resources for multiple receiving sidelink devices. Then, one or more of the multiple receiving sidelink devices may measure the channel condition and/or the interference level of their respective sidelink channels, e.g., sidelink channels in which the receiving sidelink device(s) use for communicating with the transmitting device, and the one or more of the multiple receiving sidelink devices may feedback the channel and/or the interference measurements to the transmitting sidelink device. Based on the feedback from multiple receiving sidelink devices, the transmitting sidelink device may determine whether SDM transmission over multiple unicast destinations may be enabled or applied.

In another aspect of the present disclosure, a transmitting sidelink device may determine whether to request multiple receiving sidelink devices to perform channel and/or interference measurements (e.g., for determining whether to apply SDM for unicast transmissions) based on one or more defined conditions. For example, the transmitting sidelink device may initiate/request channel and/or interference measurements from multiple receiving sidelink devices by indicating or configuring CMR and/or IMR resources for the multiple receiving sidelink devices. The indication and/or configuration of CMR/IMR resources may be triggered or scheduled by the transmitting UE based on, e.g., channel busy ratio (CBR) measurements, consecutive transmission failures (e.g., due to half duplex restrict), transmission qualities, and/or other defined condition(s), etc. For example, when the CBR of a sidelink channel is above a threshold (e.g., the sidelink channel is congested) and/or when transmitting sidelink device is unable to transmit a packet for a number of times (e.g., due to lack of sidelink resources), the transmitting sidelink device may be configured to trigger the SDM transmission determination procedure by allocating or scheduling CMR/IMR resources for the receiving sidelink devices. In other examples, the configuration of CMR and IMR resources may be triggered by a transmitting sidelink device (e.g., a transmission UE), i.e., the first sidelink device for determining SDM transmission to multiple receiving sidelink devices or UEs.

When the multiple receiving sidelink devices detect the presence of the CMR and/or IMR resources in a sidelink channel, the multiple receiving sidelink devices may be configured to perform channel and/or interference measurements for the sidelink channel, and feedback the channel and/or interference measurements back to the transmitting sidelink device. Then, the transmitting device may determine whether to enable SDM transmission based at least in part on the received channel measurements and/or interference measurements. In one example, the transmitting sidelink device may additionally transmit indications to the receiving sidelink devices to perform the channel and/or the interference measurements for their respective sidelink channels, such as through sidelink control information (CSI). For example, the triggering of CMR/IMR resource allocation/configuration may be indicated from a transmitting sidelink device to a receiving sidelink device in SCI, such as via a 2nd stage SCI (e.g., SCI-2). In addition, the transmitting sidelink device may configure one or more parameters for CSI-RS transmission (e.g., for requesting CMR/IMR measurements) via higher (or upper) layer parameter(s) for each CSI-RS configuration in its corresponding unicast link. As such, after the transmitting sidelink device transmits or configures CMR/IMR resources for the multiple receiving sidelink devices, the multiple receiving sidelink devices may perform channel measurement for their respective sidelink channels based on the CMR resource and/or perform interference measurement for their respective sidelink channels based on the IMR resource when they receive the indication to perform the CMR/IMR measurements from the transmitting device. For purpose of the present disclosure, the term "higher layer(s)" or "upper layer(s)" may refer to non-physical layer(s) of a sidelink device or UE. For example, the higher layer or the upper layer may include media access control (MAC) layer, radio link control (RLC) layer, radio resource control (RRC) layer, packet data convergence control (PDCP) layer and/or non-access stratum (NAS) protocol layer, etc.

Figure 13:
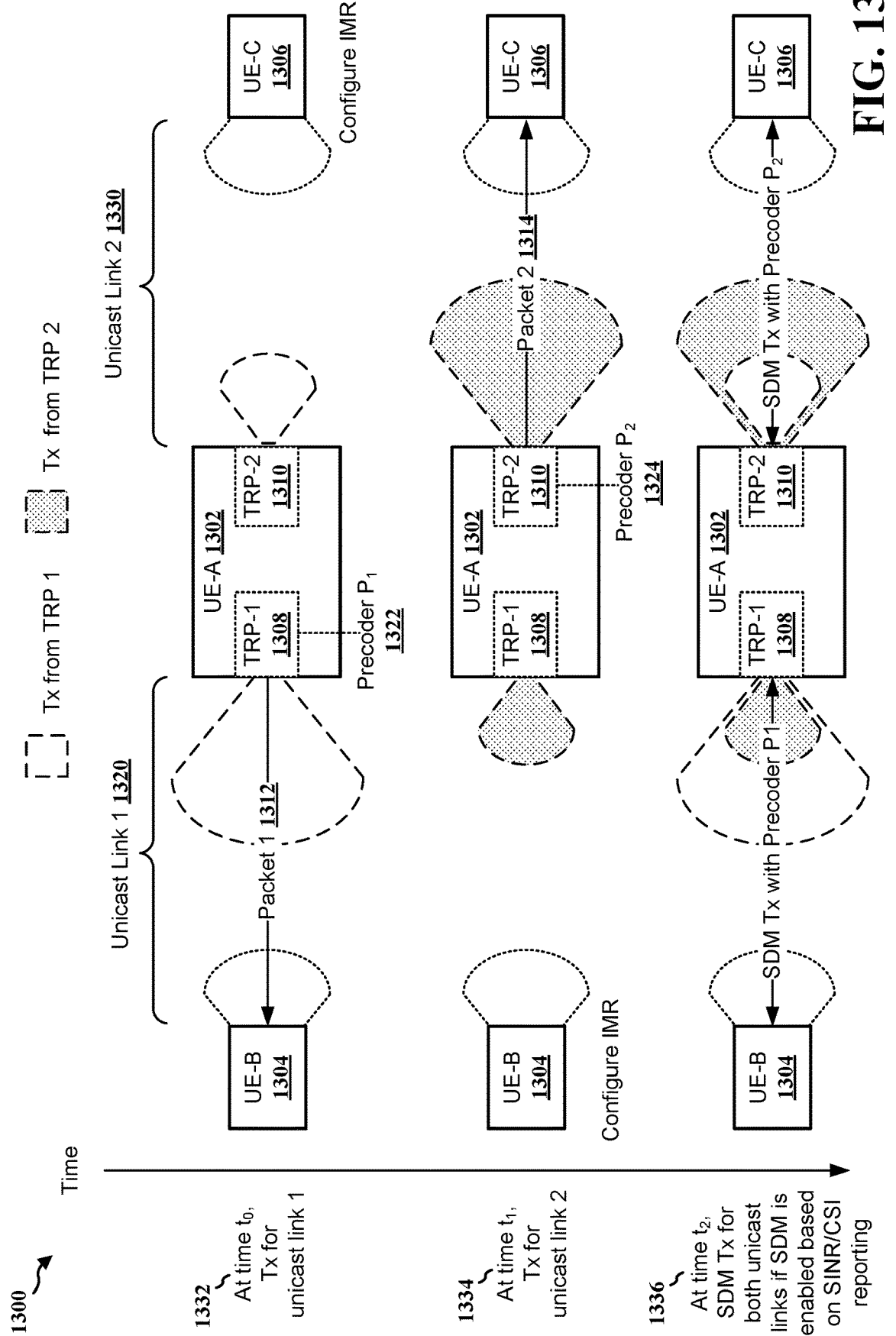
FIG. 13 is a diagram illustrating an example procedure of performing channel and interference measurements for multiple unicast SDM transmission determination according to aspects of the present disclosure.

FIG. 13 is a diagram illustrating an example procedure 1300 of performing channel and interference measurements for multiple unicast SDM transmission determination according to aspects of the present disclosure. As described in connection with FIGS. 8 and 12, a transmitting sidelink device 1302 (e.g., a first UE) may include a first TRP 1308 that may have a transmission coverage/range in a direction (e.g., front of an automobile or a mobile device) and a second TRP 1310 that may have a transmission coverage/range in another direction (e.g., rear of the automobile or the mobile device). The transmitting sidelink device 1302 may apply a first precoder 1322 (e.g., $P_1$) to a first transmission from the first TRP 1308 and may apply a second precoder 1324 (e.g., $P_2$) to the second transmission from the second TRP 1310. The first precoder 1322 may be associated with a first spatial layer of an SDM transmission, and the second precoder 1324 may be associated with a second spatial layer of the SDM transmission, such as described above. The transmitting sidelink device 1302 may establish a first unicast link 1320 with a first receiving sidelink device 1304 (e.g., a second UE) and a second unicast link 1330 with a second receiving sidelink device 1306 (e.g., a third UE), such that the transmitting sidelink device 1302 may communicate with both sidelink devices over the sidelink unicast links, e.g., as described in connection with FIG. 8.

As shown at 1332, at time zero ($t_0$), the transmitting sidelink device 1302 may transmit a first packet 1312 using the first precoder 1322 from the first TRP 1308. For example, the transmitting sidelink device 1302 may transmit the first packet 1312 in a first slot that is scheduled/configured as a CMR resource for the first receiving sidelink device 1304 (e.g., via the first unicast link 1320). The transmitting sidelink device 1302 may also configure the first slot as an IMR resource for the second receiving sidelink device 1306. The transmitting sidelink device 1302 may transmit CSI-RS in the first packet 1312, where the CSI-RS. The CMR resources for the first unicast link 1320 and IMR resources for the second unicast link 1330 may be configured for measurement of the CSI-RS. The transmitting sidelink device 1302 may configure (e.g., via an indication or signaling) the first receiving device 1304 to perform channel measurement for the first unicast link 1320 using the CMR resources and to report/feedback the channel measurement, and the transmitting sidelink device 1302 may also configure (e.g., via an indication or signaling) the second receiving sidelink device 1306 to perform interference measurement for the second unicast link 1330 using the IMR resources and to report/feedback the interference measurement. While the example in FIG. 13 shows that the transmitting sidelink device 1302 transmits the first packet 1312 to the first receiving sidelink device 1304 from the first TRP 1308, the first packet 1312 may be received by one or more sidelink devices within the transmission range (e.g., the range 401 in FIG. 4) of the transmitting sidelink device 1302, which may include the second receiving sidelink device 1306 and other sidelink devices.

In response, the first sidelink receiving device 1304 may perform channel measurement for the first unicast link 1320 based on the received/configured CMR resources, and may report/feedback the channel measurement for the first unicast link 1320 back to the transmitting sidelink device 1302. The second receiving sidelink device 1306 may perform interference measurement for the second unicast link 1330 based on the received/configured IMR resources, and may report/feedback the interference measurement for the second unicast link 1330 back to the transmitting sidelink device 1302. Based, at least in part, on the channel measurement from the first receiving sidelink device 1304 and the interference measurement from the second receiving sidelink device 1306, the transmitting sidelink device 1302 may determine/calculate a signal-to-interference-plus-noise-ratio (SINR) corresponding to the first precoder 1322 used at the first receiving sidelink device 1304 and the second receiving sidelink device 1306. In one example, the SINR may be derived based on $SINR=S/(I+N)$, where S may denote signal power, N may denote noise and I may denote interference level. The signal power S and the noise N may be derived based on channel estimation/measurement of the CMR, and the interference level I may be derived based on measurement of the IMR.

As shown at 1334, at time one ($t_1$), the transmitting sidelink device 1302 may transmit a second packet 1314 using the second precoder 1324 from the second TRP 1310. For example, the transmitting sidelink device 1302 may transmit the second packet 1314 in a second slot that is scheduled/configured as a CMR resource for the second receiving sidelink device 1306 (e.g., via the second unicast link 1330) and an IMR resource for the first receiving sidelink device 1304. The transmitting sidelink device 1302 may transmit CSI-RS in the second packet 1314, where the CMR resources for the second unicast link 1330 and IMR resources for the first unicast link 1320 are configured for measurement of the CSI-RS. The transmitting sidelink device 1302 may configure (e.g., via an indication or signaling) the second receiving device 1306 to perform channel measurement for the second unicast link 1330 using the CMR resources and to report/feedback the channel measurement, and the transmitting sidelink device 1302 may also configure (e.g., via an indication or signaling) the first receiving device 1304 to perform interference measurement for the first unicast link 1320 using the IMR resources and to report/feedback the interference measurement. While the example in FIG. 13 shows that the transmitting sidelink device 1302 transmits the second packet 1314 to the second receiving sidelink device 1306 from the second TRP 1310, the second packet 1314 may be received by one or more sidelink devices within the transmitting sidelink device's transmission range, which may include the first receiving sidelink device 1304.

In response, the third sidelink device 1306 may perform channel measurement for the second unicast link 1330 based on the received/configured CMR resources, and may report/feedback the channel measurement for the second unicast link 1330 back to the transmitting sidelink device 1302. The second sidelink device 1304 may perform interference measurement for the first unicast link 1320 based on the received/configured IMR resources, and may report/feedback the interference measurement for the first unicast link 1320 back to the transmitting sidelink device 1302. Based on the channel measurement from the second receiving sidelink device 1306 and the interference measurement from the first receiving sidelink device 1306, the transmitting sidelink device 1302 may determine/calculate SINR corresponding to the second precoder 1324 used at the first receiving sidelink device 1304 and the second receiving sidelink device 1306.

As shown at 1336, at time two ($t_2$), the transmitting sidelink device 1302 may determine whether multiple unicast SDM transmission may be applied or enabled for the first unicast link 1320 and the second unicast link 1330 based at least in part on the received channel and interference measurements for the first unicast link 1320 and the second unicast link 1330. For example, the transmitting sidelink device 1302 may determine whether to apply SDM transmission for the first unicast link 1320 and the second unicast link 1330 based on the SINR determined/calculated for the first precoder 1322 and the second precoder 1324, such as when the SINR reaches or is above a threshold. If the transmitting sidelink device 1302 determines that the SDM transmission may be applied or enabled for the first unicast link 1320 and the second unicast link 1330, the transmitting sidelink device 1302 may communicate with (e.g., transmit data to or receive data from) the first receiving sidelink device 1304 and the second receiving sidelink device 1306 based on SDM transmission. For example, the transmitting sidelink device 1302 may transmit a first packet to the first receiving sidelink device 1304 using the first precoder 1322 (e.g., via the first spatial layer of the SDM transmission) and a second packet to the second receiving sidelink device 1306 using the second precoder 1324 (e.g., via the second spatial layer of the SDM transmission) such that the first packet and the second packet may be transmitted using same frequency and time resources. In other words, the transmitting sidelink device may apply SDM to the first unicast link 1320 and the second unicast link 1330 as a rank-2 transmission with Precoder=[first TRP precoder, second TRP precoder], where a first spatial layer may be mapped to the first unicast link 1320 and a second spatial layer may be mapped to the second unicast link 1330, etc.

Figure 14:
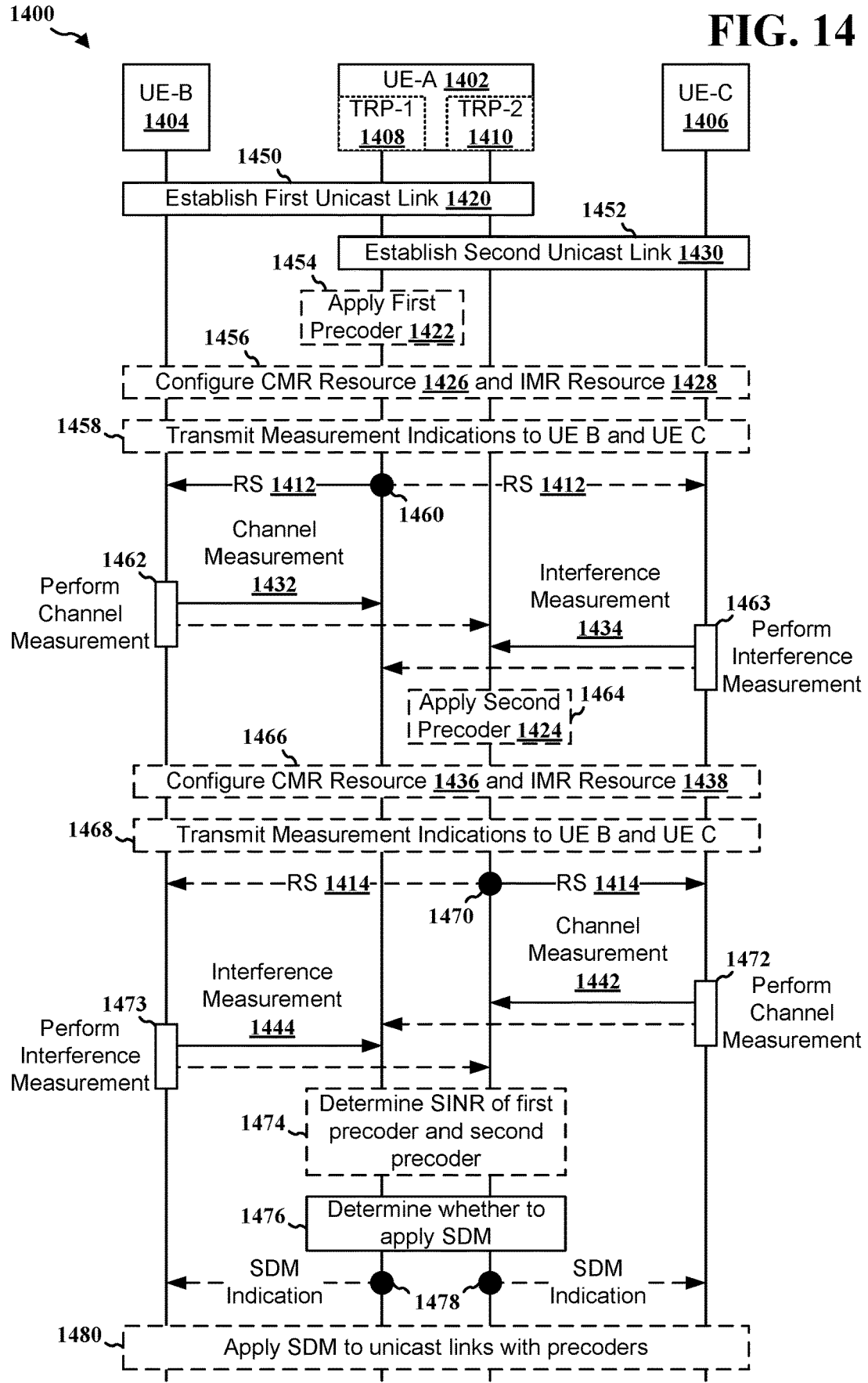
FIG. 14 is a communication flow between a transmitting sidelink device and multiple receiving sidelink devices according to aspects of the present disclosure.

FIG. 14 is a communication flow 1400 between a transmitting sidelink device and multiple receiving sidelink devices according to aspects of the present disclosure. Optional aspects are illustrated with a dashed line. As described in connection with FIGS. 8 and 12, a transmitting sidelink device 1402 (e.g., a first UE) may include a first TRP 1408 and a second TRP 1410. The first TRP 1408 may transmit a signal having a first precoder 1422 applied and the second TRP 1410 may transmit a signal having a second precoder 1424 applied. The first precoder 1422 may be associated with a first spatial layer of an SDM transmission, and the second precoder 1424 may be associated with a second spatial layer of the SDM transmission.

At 1450, the transmitting sidelink device 1402 may establish a first unicast link 1420 with a first receiving sidelink device 1404 (e.g., a second UE), and at 1452, the transmitting sidelink device 1402 may establish a second unicast link 1430 with a second receiving sidelink device 1406 (e.g., a third UE), such that the transmitting sidelink device 1402 may communicate with the first receiving sidelink device 1404 and the second receiving sidelink device 1406 over their dedicated sidelink unicast links, e.g., as described in connection with FIG. 8.

At 1454, the transmitting sidelink device 1402 may precode a first reference signal (RS) 1412 with the first precoder 1422. At 1456, the transmitting sidelink device 1402 may configure or trigger CMR resource 1426 and IMR resource 1428 for the first RS 1412, where the CMR resource 1426 may enable a receiving sidelink device to perform channel measurement for a sidelink channel and the IMR resource 1428 may enable a receiving sidelink device to perform interference measurement for a sidelink channel. The configuration, at 1458, may also be performed prior to application of the first precoder, at 1422. At 1458, the transmitting sidelink device 1402 may optionally transmit measurement indications to the first receiving sidelink device 1404 and the second receiving sidelink device 1406. For example, the transmitting sidelink device 1402 may indicate to the first receiving sidelink device 1404 to perform channel measurement for the first unicast link 1420 based on the CMR resource 1426 of the first RS 1412 and to report/feedback the channel measurement back to the transmitting sidelink device 1402. The transmitting sidelink device 1402 may also indicate to the second receiving sidelink device 1406 to perform interference measurement for the second unicast link 1430 based on the IMR resource 1428 of the first RS 1412 and to report/feedback the interference measurement back to the transmitting sidelink device 1402. In some examples, the configuration of CMR and IMR may be triggered by the transmitting sidelink device for determining SDM transmission to the first receiving sidelink device 1404 and the second receiving sidelink device 1406.

At 1460, the transmitting sidelink device 1402 may transmit the first RS 1412 from the first TRP 1408, where the first RS 1412 may be transmitted using the first precoder 1422 (e.g., applied at 1454). For example, the transmitting sidelink device 1402 may transmit the first RS 1412 in a first slot that is scheduled/configured for the first receiving sidelink device 1404 (e.g., via the first unicast link 1420). While the first RS 1412 may be scheduled for the first receiving sidelink device 1404, the first RS 1412 may be received by one or more sidelink devices within the transmission range of the transmitting sidelink device 1402, which may include the second receiving sidelink device 1406 and other sidelink devices.

At 1462, in response to the configured CMR resource 1426 and/or the measurement indication (e.g., received at 1458), the first receiving sidelink device 1404 may perform a channel measurement for the first unicast link 1420 based on the received/configured CMR resource 1426, and may report/feedback channel measurement 1432 for the first unicast link 1420 back to the transmitting sidelink device 1402. The channel measurement 1432 may be received by the first TRP 1408 and/or the second TRP 1410. Similarly, at 1463, in response to the configured IMR resource 1428 and/or the measurement indication (e.g., received at 1458), the second receiving sidelink device 1406 may perform an interference measurement for the second unicast link 1430 based on the received/configured IMR resources 1428, and may report/feedback interference measurement 1434 for the second unicast link 1430 back to the transmitting sidelink device 1402. The interference measurement 1434 may be received by the first TRP 1408 and/or the second TRP 1410 of the transmitting sidelink device 1402.

At 1464, the transmitting sidelink device 1402 may precode a second reference signal (RS) 1414 with the second precoder 1424. At 1466, the transmitting sidelink device 1402 may configure, or trigger, CMR resource 1436 and IMR resource 1438 for the second RS 1414, where the CMR resource 1436 may enable a receiving sidelink device to perform channel measurement for a sidelink channel and the IMR resource 1438 may enable a receiving sidelink device to perform interference measurement for a sidelink channel. The configuration, at 1466, may also be performed prior to application of the second precoder, at 1424. As well, the configuration 1466 may be performed before the transmission of the RS, at 1412. At 1468, the transmitting sidelink device 1402 may optionally transmit measurement indications to the first receiving sidelink device 1404 and the second receiving sidelink device 1406. For example, the transmitting sidelink device 1402 may indicate to the second receiving sidelink device 1406 to perform a channel measurement for the second unicast link 1430 based on the CMR resource 1436 of the second RS 1414 and to report/feedback the channel measurement back to the transmitting sidelink device 1402. The transmitting sidelink device 1402 may also indicate to the first receiving sidelink device 1404 to perform an interference measurement for the first unicast link 1430 based on the IMR resource 1438 of the second RS 1414 and to report/feedback the interference measurement back to the transmitting sidelink device 1402.

At 1470, the transmitting sidelink device 1402 may transmit the second RS 1414 from the second TRP 1410, where the second RS 1414 may be transmitted using the second precoder 1424 (e.g., applied at 1464). For example, the transmitting sidelink device 1402 may transmit the second RS 1414 in a second slot that is scheduled/configured for the second receiving sidelink device 1406 (e.g., via the second unicast link 1430). While the second RS 1414 may be scheduled for the second receiving sidelink device 1406, the second RS 1414 may be received by one or more sidelink devices within the transmission range of the transmitting sidelink device 1402, which may include the first receiving sidelink device 1404 and other sidelink devices.

At 1472, in response to the configured CMR resource 1436 and/or the measurement indication (e.g., received at 1468), the second receiving sidelink device 1404 may perform a channel measurement for the second unicast link 1430 based on the received/configured CMR resource 1436, and may report/feedback channel measurement 1442 for the second unicast link 1430 back to the transmitting sidelink device 1402. The channel measurement 1442 may be received by the first TRP 1408 and/or the second TRP 1410. Similarly, at 1473, in response to the configured IMR resource 1438 and/or the measurement indication (e.g., received at 1468), the first receiving sidelink device 1404 may perform an interference measurement for the first unicast link 1420 based on the received/configured IMR resources 1438, and may report/feedback interference measurement 1444 for the first unicast link 1420 back to the transmitting sidelink device 1402. The interference measurement 1444 may be received by the first TRP 1408 and/or the second TRP 1410 of the transmitting sidelink device 1402.

At 1474, based at least in part on the channel measurement 1432 from the first receiving sidelink device 1404 and the interference measurement 1434 from the second receiving sidelink device 1406, the transmitting sidelink device 1402 may determine/calculate SINR corresponding to the first precoder 1422 used at the first receiving sidelink device 1404 and the second receiving sidelink device 1406. Similarly, based at least in part on the channel measurement 1442 from the second receiving sidelink device 1406 and the interference measurement 1444 from the first receiving sidelink device 1406, the transmitting sidelink device 1402 may determine/calculate SINR corresponding to the second precoder 1424 used at the first receiving sidelink device 1404 and the second receiving sidelink device 1406.

At 1476, the transmitting sidelink device 1402 may determine whether multiple unicast SDM transmission may be applied or enabled for the first unicast link 1420 and the second unicast link 1430 based at least in part on the received channel measurements (e.g., 1432, 1442) for the first unicast link 1420 and the second unicast link 1430, the received interference measurements (e.g., 1434, 1444) for the first unicast link 1420 and the second unicast link 1430. For example, the transmitting sidelink device 1402 may determine whether to apply SDM transmission for the first unicast link 1420 and the second unicast link 1430 using the first precoder 1422 and the second precoder 1424 based at least in part on the SINR calculated for the first precoder 1422 and the second precoder 1424.

At 1478, if the transmitting sidelink device 1402 determines that the SDM transmission may be applied or enabled for the first unicast link 1420 and the second unicast link 1430, the transmitting sidelink device 1402 may optionally transmit an SDM indication to the first receiving sidelink device 1404 and the second receiving sidelink device 1406 informing that the communication for the first unicast link 1420 and the second unicast link 1430 may be based on SDM transmission. The transmitting sidelink device 1402 may also transmit a configuration related to the SDM transmission to the first receiving sidelink device 1404 and the second receiving sidelink device 1406, such as DMRS port number, DMRS port index and other SCI related parameters, such as HARQ process ID, redundancy version, destination ID, communication requirement, etc.

At 1480, the transmitting sidelink device 1402 may communicate with (e.g., transmit data to or receive data from) the first receiving sidelink device 1404 and the second receiving sidelink device 1406 based on SDM transmission. For example, the transmitting sidelink device 1402 may transmit a first packet to the first receiving sidelink device 1404 using the first precoder 1422 (e.g., via the first spatial layer of the SDM transmission) and a second packet to the second receiving sidelink device 1406 using the second precoder 1424 (e.g., via the second spatial layer of the SDM transmission) such that the first packet and the second packet may be transmitted from the transmitting sidelink device 1402 using same frequency and time resources.

In one aspect of the present disclosure, a transmitting sidelink device (e.g., 1302, 1402) may configure the CMR resource (e.g., 1426, 1436) and/or the IMR resource (e.g., 1428, 1438) for multiple receiving sidelink devices (e.g., 1304, 1306, 1404, 1406) based on CSI-RS configuration, such as configuring the CMR and/or the MIR resources as an extension of the CSI-RS. In other words, the CMR and MIR resources may be part of CSI-RS configuration.

Figure 15:
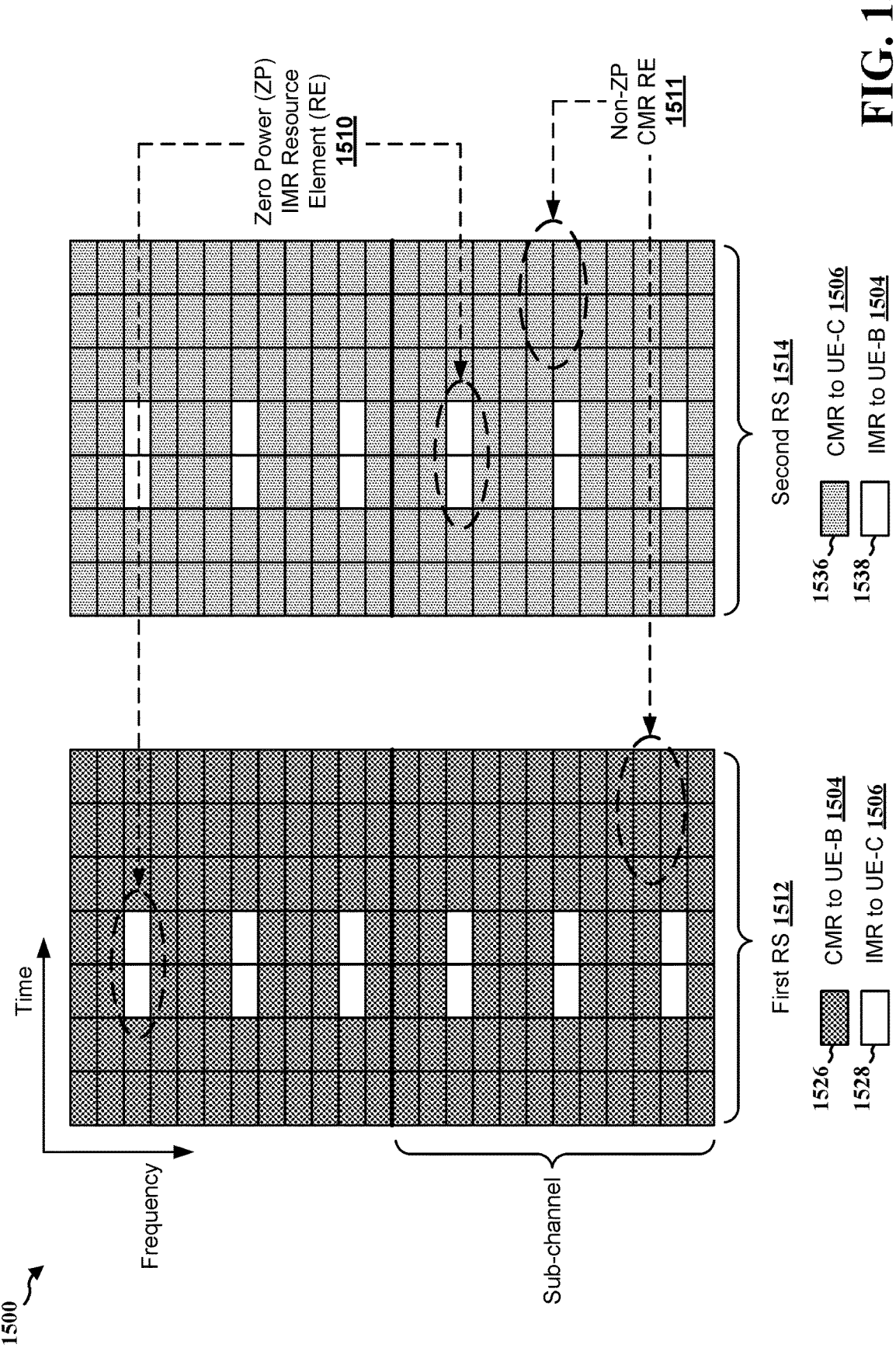
FIG. 15 is a diagram illustrating an example of ZP IMR according to aspects of the present disclosure.

In one example, a transmitting sidelink device may configure/indicate IMR resource to a receiving UE based on zero power (ZP) resources in the CSI-RS configuration. FIG. 15 is a diagram 1500 illustrating an example of ZP IMR resource which may be used by multiple receiving sidelink devices (e.g., the first receiving sidelink device 1304, 1404; the second receiving sidelink device 1306, 1406) for measuring interference power of their respective sidelink channels (e.g., their unicast connections with the transmitting sidelink device). For example, when a transmitting sidelink device (e.g., 1302, 1402) is transmitting a first RS 1512 (e.g., 1412) to a first receiving device 1504 (e.g., 1404) and a second receiving device 1506 (e.g., 1406), the transmitting sidelink device may configure/include one or more ZP resource elements (REs) 1510 in the first RS 1512 as IMR resource 1528 (e.g., 1428). The transmitting sidelink device may be configured not to transmit any power for the ZP REs 1510 (e.g., the IMR resource 1528), such that the second receiving sidelink device 1506 and other sidelink devices having unicast connection with the transmitting sidelink device may measure the interference power of their corresponding unicast links (e.g., 1330, 1430) based on the MIR resource 1528. The transmitting sidelink device may also configure/transmit one or more none-ZP REs 1511 in the second RS 1512 as CMR resource 1526 (e.g., 1426), such that the first receiving device 1504 may perform channel measurement for its unicast link based on the CMR resource 1526.

Similarly, when the transmitting sidelink device is transmitting a second RS 1514 (e.g., 1414) to the first receiving device 1504 and the second receiving device 1506, the transmitting sidelink device may configure/include one or more ZP REs 1510 in the second RS 1514 as IMR resource 1538 (e.g., 1438). As the transmitting sidelink device may be configured not to transmit any power for the ZP REs 1510 (e.g., the IMR resource 1538), the first receiving sidelink device 1504 and other sidelink devices having unicast connection with the transmitting sidelink device may measure the interference power of their corresponding unicast links (e.g., 1320, 1420) based on the IMR resource 1538. The transmitting sidelink device may also configure/transmit one or more none-ZP REs in the second RS 1514 as CMR resource 1536 (e.g., 1436), such that the second receiving device 1506 may perform channel measurement for its unicast link based on the CMR resource 1536. As such, the transmitting sidelink device may trigger ZP-resources IMR to let one or more candidate receiving sidelink devices (e.g., Rx UEs) to measure the interference power in separate unicast link. The transmitting sidelink device may then use the feedback to estimate the per-TRP interference and SINR to decide if SDM transmission among multiple unicast links may be enabled, such as described in connection with 1474 and 1476 of FIG. 14. Also, the configuring of CMR and IMR may be triggered by the transmitting sidelink device, i.e., the first SL device for determining SDM transmission to both receiving devices or UEs.

In another aspect of the present disclosure, the CMR resource (e.g., 1426, 1436) and/or IMR resource (e.g., 1428, 1438) may be configured to be part of control demodulation reference signal (DMRS) (e.g., PSCCH DMRS), data DMRS (e.g., PSSCH DMRS), or data/control REs.

In another aspect of the present disclosure, when a transmitting sidelink device (e.g., 1302, 1402) is communicating with a receiving sidelink device (e.g., 1304, 1306, 1404, 1406) over a unicast link, the transmitting device may indicate DMRS port number for the communication through a control signal, such as via a $1^{st}$ stage SCI (e.g., SCI-1). For example, the transmitting sidelink device may indicate a one-bit (e.g., zero (0') or one (1')) DMRS port number to the receiving sidelink device, where '1' may imply it is a Rank-2 transmission and ports 1000 and 1001 may be used for the Rank-2 transmission. When SDM transmission is enabled over multiple unicast links (e.g., over multiple spatial layers), the transmitting sidelink device may indicate DMRS port index for unicast link/packet to one or more receiving sidelink devices via a 2 nd stage SCI (e.g., SCI-2), such that the one or more receiving sidelink devices may decode the packet/data with the specific DMRS port index (e.g., for channel measurement/estimation). In addition, if the SDM transmission is enabled, the transmitting sidelink device may optionally or additionally configure/update other parameters in the 2 nd stage SCI accordingly for the SDM transmission, such as HARQ Process ID, redundancy version, destination ID, communication range requirement, etc.

For example, as each receiving sidelink device may be at a different distance from the transmitting sidelink device and/or may have different transmission/unicast configuration, the transmitting sidelink device may configure multiple receiving sidelink devices through SCI (e.g., SCI-1 and SCI-2) for the SDM transmission before applying SDM to the transmission, such that the multiple receiving sidelink devices may be able to communicate with the transmitting device based on the SDM transmission.

Figure 16:
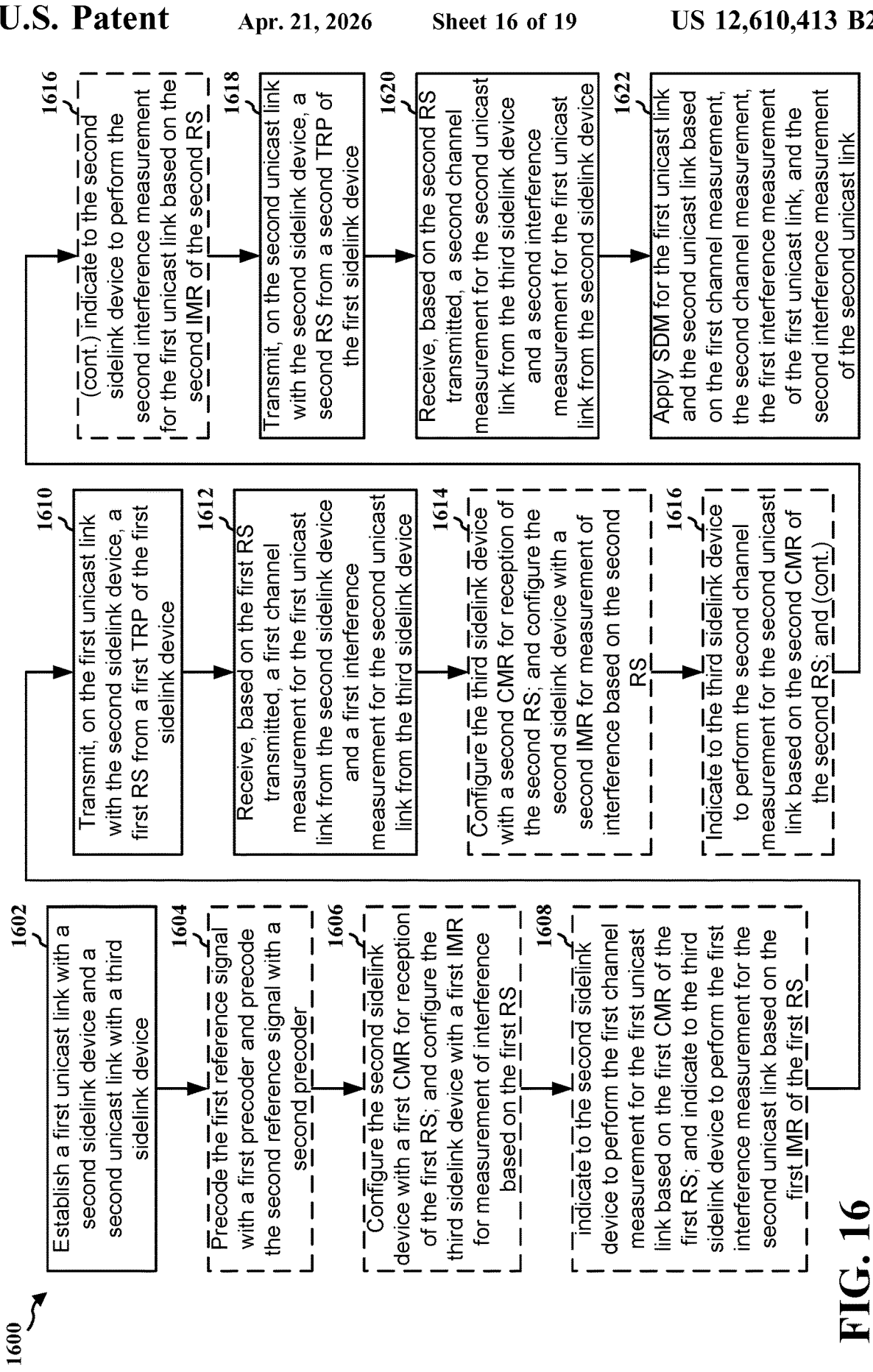
FIG. 16 is a flowchart of a method of wireless communication.

FIG. 16 is a flowchart 1600 of a method of wireless communication. The method may be performed by a first sidelink device communicating based on sidelink (e.g., the UE 104, 402, 404, 406, 408; the transmitting UE 602, 802, 1202; the transmitting sidelink device 1302, 1402; the sidelink device 702; the device 310 or 350; the RSU 407; the apparatus 1702). Optional aspects are illustrated with a dashed line. The method may enable the first sidelink device to indicate to multiple sidelink devices to perform and report channel and interference measurements for multiple unicast links, and the first sidelink device may determine whether to enable/apply SDM transmission to the multiple unicast links based at least in part on the channel and interference measurements received from multiple sidelink devices.

At 1602, the first sidelink device may establish a first unicast link with a second sidelink device and a second unicast link with a third sidelink device, such as described in connection with FIGS. 8, 12 to 15. For example, at 1450 of FIG. 14, the transmitting sidelink device 1402 may establish a first unicast link 1420 with a first receiving sidelink device 1404, and at 1452, the transmitting sidelink device 1402 may establish a second unicast link 1430 with a second receiving sidelink device 1406. The establishment of the unicast links may be performed, e.g. by the unicast link establishment component 1740 of the apparatus 1702 in FIG. 17.

At 1604, the first sidelink device may precode the first reference signal with a first precoder and precode the second reference signal with a second precoder, such as described in connection with FIGS. 13 and 14. For example, at 1454 of FIG. 14, the transmitting sidelink device 1402 may apply a first precoder 1422 to a first RS 1412, and at 1464, the transmitting sidelink device 1402 may apply a second precoder 1424 to a second RS 1414. The precoding may be performed, e.g. by the precoding component 1742 of the apparatus 1702 in FIG. 17. One or more parameters associated with the first RS or the second RS may be configured by a higher (or upper) layer of the first sidelink device.

At 1606, the first sidelink device may configure the second sidelink device with a first CMR for reception of the first RS and configure the third sidelink device with a first IMR for measurement of interference based on the first RS, such as described in connection with FIGS. 13 to 15. For example, at 1456 of FIG. 14, the transmitting sidelink device 1402 may configure CMR resource 1426 for the first receiving sidelink device 1404 for performing channel measurement for the first unicast link 1420 and the transmitting sidelink device 1402 may configure IMR resource 1428 for the second receiving sidelink device 1406 for performing interference measurement for the second unicast link 1430. The configuration of the CMR and IMR resources may be performed, e.g. by the CMR/IMR configuration component 1744 of the apparatus 1702 in FIG. 17.

At 1608, the first sidelink device may indicate to the second sidelink device to perform the first channel measurement for the first unicast link based on the first CMR of the first RS; and indicate to the third sidelink device to perform the first interference measurement for the second unicast link based on the first IMR of the first RS, such as described in connection with FIGS. 13 and 14. For example, at 1458 of FIG. 14, the transmitting sidelink device 1402 may transmit measurement indications to the first receiving sidelink device 1404 and the second receiving sidelink device 1406 to indicate to the first receiving sidelink device 1404 to perform the channel measurement for the first unicast link 1420 based on the CMR resource 1426 of the first RS 1412, and indicate to the second receiving sidelink device 1406 to perform the interference measurement for the second unicast link 1430 based on the IMR resource 1428 of the first RS 1412. The indication(s) to perform channel/interference measurements may be performed, e.g. by the measurement indication component 1746 and/or the transmission component 1734 of the apparatus 1702 in FIG. 17.

At 1610, the first sidelink device may transmit, on the first unicast link with the second sidelink device, a first RS from a first TRP of the first sidelink device, such as described in connection with FIGS. 13 and 14. For example, at 1460 of FIG. 14, the transmitting sidelink device 1402 may transmit, on the first unicast link 1420, the first RS 1412 from the first TRP 1408 of the transmitting sidelink device 1402. The transmission of the first RS may be performed, e.g. by the RS processing and transmission component 1748 and/or the transmission component 1734 of the apparatus 1702 in FIG. 17.

At 1612, the first sidelink device may receive, based on the first RS transmitted, a first channel measurement for the first unicast link from the second sidelink device and a first interference measurement for the second unicast link from the third sidelink device, such as described in connection with FIGS. 13 and 14. For example, at 1462 of FIG. 14, the transmitting sidelink device 1402 may receiving channel measurement 1432 for the first unicast link 1420 from the first receiving sidelink device 1404, and at 1463, the transmitting sidelink device 1402 may receiving interference measurement 1434 for the second unicast link 1430 from the second receiving sidelink device 1406. The reception of the measurement reports may be performed, e.g. by the measurement report reception component 1750 and/or the reception component 1730 of the apparatus 1702 in FIG. 17.

At 1614, the first sidelink device may configure the third sidelink device with a second CMR for reception of the second RS and configure the second sidelink device with a second IMR for measurement of interference based on the second RS, such as described in connection with FIGS. 13 to 15. For example, at 1466 of FIG. 14, the transmitting sidelink device 1402 may configure CMR resource 1436 for the second receiving sidelink device 1406 for performing channel measurement for the second unicast link 1430 and the transmitting sidelink device 1402 may configure IMR resource 1438 for the first receiving sidelink device 1404 for performing interference measurement for the first unicast link 1420. The configuration of the CMR and IMR resources may be performed, e.g. by the CMR/IMR configuration component 1744 of the apparatus 1702 in FIG. 17.

At 1616, the first sidelink device may indicate to the third sidelink device to perform the second channel measurement for the second unicast link based on the second CMR of the second RS, and indicate to the second sidelink device to perform the second interference measurement for the first unicast link based on the second IMR of the second RS, such as described in connection with FIGS. 13 and 14. For example, at 1468 of FIG. 14, the transmitting sidelink device 1402 may transmit measurement indications to the first receiving sidelink device 1404 and the second receiving sidelink device 1406 to indicate to the first receiving sidelink device 1404 to perform the interference measurement for the first unicast link 1420 based on the IMR resource 1438 of the RS 1414, and indicate to the second receiving sidelink device 1406 to perform the channel measurement for the second unicast link 1430 based on the CMR resource 1436 of the RS 1414. The indications for performing channel/interference measurements may be performed, e.g. by the measurement indication component 1746 and/or the transmission component 1734 of the apparatus 1702 in FIG. 17.

In one example, the first sidelink device may trigger channel measurement or interference measurement based on a number of transmission failure exceeding a threshold or a CBR exceeding a threshold for a corresponding unicast link. In another example, the first sidelink device may transmit SCI that includes one or more indications to perform channel measurements based on the first CMR or the second CMR or to perform interference measurements based on the first IMR or the second IMR.

At 1618, the first sidelink device may transmit, on the second unicast link with the third sidelink device, a second RS from a second TRP of the first sidelink device, such as described in connection with FIGS. 13 and 14. For example, at 1470 of FIG. 14, the transmitting sidelink device 1402 may transmit, on the second unicast link 1430, the RS 1414 from the second TRP 1410 of the transmitting sidelink device 1402. The transmission of the second RS may be performed, e.g. by the RS processing and transmission component 1748 and/or the transmission component 1734 of the apparatus 1702 in FIG. 17. In one example, the first sidelink device may transmit the first RS in a first slot and transmit the second RS in a second slot.

In one example, the first RS and the second RS may include a CSI-RS. In such an example, the CMR and IMR may be included in a CSI-RS configuration, where the first sidelink device may indicate the first IMR to the third sidelink device or the second IMR to the second sidelink device based on ZP resources in the CSI-RS configuration. In another example, the CMR and/or the IMR may include resources for control signaling, control DMRS and/or resources for data.

At 1620, the first sidelink device may receive, based on the second RS transmitted, a second channel measurement for the second unicast link from the third sidelink device and a second interference measurement for the first unicast link from the second sidelink device, such as described in connection with FIGS. 13 and 14. For example, at 1472 of FIG. 14, the transmitting sidelink device 1402 may receiving channel measurement 1442 for the second unicast link 1430 from the second receiving sidelink device 1406, and at 1473, the transmitting sidelink device 1402 may receiving interference measurement 1444 for the first unicast link 1420 from the first receiving sidelink device 1404. The reception of the measurement reports may be performed, e.g. by the measurement report reception component 1750 and/or the reception component 1730 of the apparatus 1702 in FIG. 17.

At 1622, the first sidelink device may apply SDM for the first unicast link and the second unicast link based on the first channel measurement, the second channel measurement, the first interference measurement of the first unicast link, and the second interference measurement of the second unicast link, such as described in connection with FIGS. 13 and 14. For example, at 1476 of FIG. 14, the transmitting sidelink device 1402 may determine whether to apply SDM based the received channel and interference measurements of the first unicast link 1420 and the second unicast link 1430. Then, at 1480, the transmitting sidelink device 1402 may apply SDM for the first unicast link 1420 and the second unicast link 1430 based on the determination. The determination of whether to enable SDM transmission may be performed, e.g. by the SDM determination component 1752 of the apparatus 1702 in FIG. 17, and the application of the SDM for the first unicast link and the second unicast link may be performed, e.g. by the SDM communication component 1754 of the apparatus 1702 in FIG. 17.

In one example, the first precoder may be associated with a first spatial layer of an SDM transmission and the second precoder may be associated with a second spatial layer of an SDM transmission. As such, under the SDM transmission, the first sidelink device may transmit a first transmission to the second sidelink device via the first spatial layer and a second transmission to the third sidelink device via the second spatial layer using a same frequency and time resources.

In another example, the first sidelink device may determine whether to apply SDM based on the SINR associated with each precoder, such as described in connection with 1474 of FIG. 14. For example, the first sidelink device may determine a first SINR corresponding to a first precoder based on the first channel measurement for the first unicast link from the second sidelink device and the first interference measurement for the second unicast link from the third sidelink device, and the first sidelink device may also determining a second SINR corresponding to a second precoder based on the second channel measurement for the second unicast link from the third sidelink device and the second interference measurement for the first unicast link from the second sidelink device, wherein the sidelink device applies the SDM for transmission on the first unicast link and the second unicast link based on at least one of the first SINR and the second SINR meeting a threshold.

In another example, when the first sidelink device determines that SDM transmission may be enabled for the first unicast link and the second unicast link, the first sidelink device may indicate a DMRS port index for the first unicast link to the second sidelink device and a DMRS port index for the second unicast link to the third sidelink device via a second stage SCI transmitted in PSSCH. In addition, the first sidelink device may configure, via the second stage SCI, one or more parameters associated with the SDM. For example, the one or more parameters may include at least one of a HARQ ID, a redundancy version, a destination ID, or a communication range requirement, etc.

Figure 17:
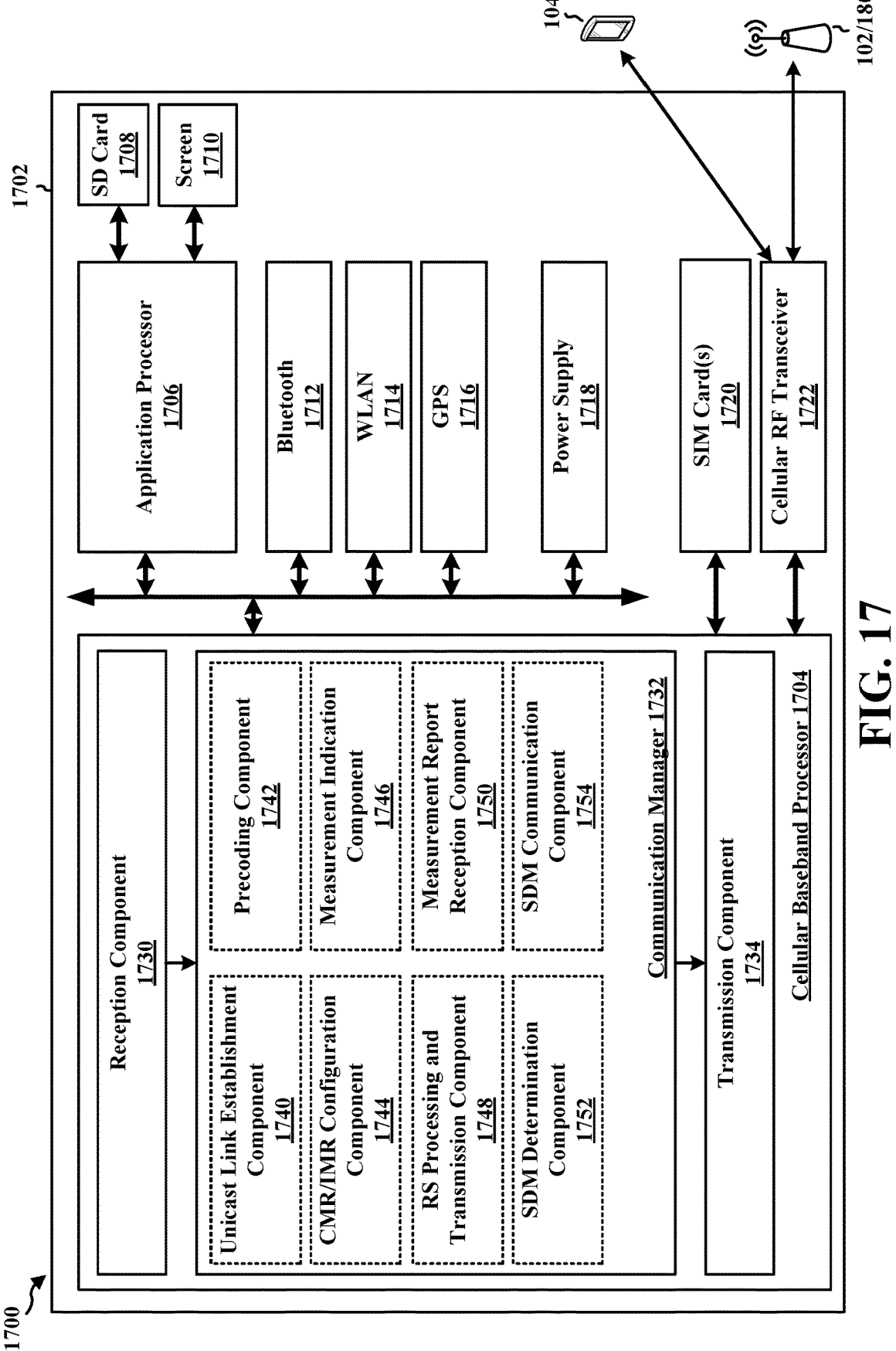
FIG. 17 is a diagram illustrating an example of a hardware implementation for an example apparatus.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The cellular baseband processor 1704 communicates through the cellular RF transceiver 1722 with the UE 104 and/or BS 102/180. The cellular baseband processor 1704 may include a computer-readable storage medium/memory. The computer-readable storage medium/memory may be non-transitory. The cellular baseband processor 1704 is responsible for general processing, including the execution of software stored on the computer-readable storage medium/memory. The software, when executed by the cellular baseband processor 1704, causes the cellular baseband processor 1704 to perform the various functions described supra. The computer-readable storage medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable storage medium/memory and/or configured as hardware within the cellular baseband processor 1704. The cellular baseband processor 1704 may be a component of the device 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire wireless device (e.g., see 350 of FIG. 3) and include the additional modules of the apparatus 1702.

The communication manager 1732 includes unicast link establishment component 1740 that is configured to establish a first unicast link with a second sidelink device and a second unicast link with a third sidelink device, e.g., as described in connection with 1602 in FIG. 16. The communication manager 1732 further includes a precoding component 1742 configured to precode the first reference signal with a first precoder and precode the second reference signal with a second precoder, e.g., as described in connection with 1604 in FIG. 16. The communication manager 1732 further includes a CMR/IMR component 1744 configured to configure the second sidelink device with a first CMR for reception of the first RS, configure the third sidelink device with a first IMR for measurement of interference based on the first RS, configure the third sidelink device with a second CMR for reception of the second RS, and configure the second sidelink device with a second IMR for measurement of interference based on the second RS, e.g., as described in connection with 1606 and/or 1614 in FIG. 16. The communication manager 1732 further includes a measurement indication component 1746 configured to indicate to the second sidelink device to perform the first channel measurement for the first unicast link based on the first CMR of the first RS, indicate to the third sidelink device to perform the first interference measurement for the second unicast link based on the first IMR of the first RS, indicate to the third sidelink device to perform the second channel measurement for the second unicast link based on the second CMR of the second RS, and indicate to the second sidelink device to perform the second interference measurement for the first unicast link based on the second IMR of the second RS, e.g., as described in connection with 1608 and/or 1616 in FIG. 16. The communication manager 1732 further includes an RS processing and transmission component 1748 configured to transmit, on the first unicast link with the second sidelink device, a first RS from a first TRP of the first sidelink device, and transmit, on the second unicast link with the third sidelink device, a second RS from a second TRP of the first sidelink device, e.g., as described in connection with 1610 and/or 1618 in FIG. 16. The communication manager 1732 further includes a measurement report reception component 1750 configured to receive, based on the second RS transmitted, a second channel measurement for the second unicast link from the third sidelink device and a second interference measurement for the first unicast link from the second sidelink device, e.g., as described in connection with 1620 in FIG. 16. The communication manager 1732 further includes an SDM determination component 1752 and/or an SDM communication component 1752 configured to apply SDM for the first unicast link and the second unicast link based on the first channel measurement, the second channel measurement, the first interference measurement of the first unicast link, and the second interference measurement of the second unicast link, e.g., as described in connection with 1622 in FIG. 16.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable storage medium for implementation by a processor, or some combination thereof.

In one configuration, the apparatus 1702, and in particular the cellular baseband processor 1704, includes means for establishing a first unicast link with a second sidelink device and a second unicast link with a third sidelink device (e.g., the unicast link establishment component 1740). The apparatus 1702 includes means for transmitting, on the first unicast link with the second sidelink device, a first RS from a first TRP of the first sidelink device (e.g., the RS processing and transmission component 1748 and/or the transmission component 1734). The apparatus 1702 includes means for receiving, based on the first RS transmitted, a first channel measurement for the first unicast link from the second sidelink device and a first interference measurement for the second unicast link from the third sidelink device (e.g., the measurement report reception component 1750 and/or the reception component 1730). The apparatus 1702 includes means for transmitting, on the third unicast link with the second sidelink device, a second RS from a second TRP of the first sidelink device (e.g., the RS processing and transmission component 1748 and/or the transmission component 1734). The apparatus 1702 includes means for receiving, based on the second RS transmitted, a second channel measurement for the second unicast link from the third sidelink device and a second interference measurement for the first unicast link from the second sidelink device (e.g., the measurement report reception component 1750 and/or the reception component 1730). The apparatus 1702 includes means for applying SDM for the first unicast link and the second unicast link based on the first channel measurement, the second channel measurement, the first interference measurement of the first unicast link, and the second interference measurement of the second unicast link (e.g., the SDM determination component 1752, the transmission component 1734 and/or the SDM communication component 1754).

In one configuration, the apparatus 1702 may further include means for precoding the first reference signal with a first precoder and means for precoding the second reference signal with a second precoder (e.g., the precoding component 1742). The apparatus 1702 may further include means for transmitting the SDM transmission comprising a first transmission to the second sidelink device via the first spatial layer and a second transmission to the third sidelink device via the second spatial layer using a same frequency and time resources (e.g., the transmission component 1734 and/or the SDM communication component 1754). The apparatus 1702 may further include means for configuring the second sidelink device with a first CMR for reception of the first RS and means for configuring the third sidelink device with a first IMR for measurement of interference based on the first RS (e.g., the CMR/IMR configuration component 1744). The apparatus 1702 may further include means for configuring the third sidelink device with a second CMR for reception of the second RS and means for configuring the second sidelink device with a second IMR for measurement of interference based on the second RS (e.g., the CMR/IMR configuration component 1744). The apparatus 1702 may further include means for indicating the first IMR to the third sidelink device based on ZP resources in the CSI-RS configuration (e.g., the CMR/IMR configuration component 1744 and/or the measurement indication component 1746). The apparatus 1702 may further include means for indicating to the second sidelink device to perform the first channel measurement for the first unicast link based on the first CMR of the first RS, means for indicating to the third sidelink device to perform the first interference measurement for the second unicast link based on the first IMR of the first RS, means for indicating to the third sidelink device to perform the second channel measurement for the second unicast link based on the second CMR of the second RS, and means for indicating to the second sidelink device to perform the second interference measurement for the first unicast link based on the second IMR of the second RS (e.g., the CMR/IMR configuration component 1744 and/or the measurement indication component 1746). The apparatus 1702 may further include means for triggering channel measurement or interference measurement based on a number of transmission failure exceeding a threshold or a CBR exceeding a threshold for a corresponding unicast link (e.g., the SDM determination component 1752 and/or the SDM communication component 1754). The apparatus 1702 may further include means for transmitting SCI that includes one or more indications to perform channel measurements based on the first CMR or the second CMR or to perform interference measurements based on the first IMR or the second IMR (e.g., the transmission component 1734 and/or the CMR/IMR configuration component 1744). The apparatus 1702 may further include means for determining a first SINR corresponding to a first precoder based on the first channel measurement for the first unicast link from the second sidelink device and the first interference measurement for the second unicast link from the third sidelink device, and means for determining a second SINR corresponding to a second precoder based on the second channel measurement for the second unicast link from the third sidelink device and the second interference measurement for the first unicast link from the second sidelink device, wherein the sidelink device applies the SDM for transmission on the first unicast link and the second unicast link based on at least one of the first SINR and the second SINR meeting a threshold (e.g., the SDM determination component 1752).

The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
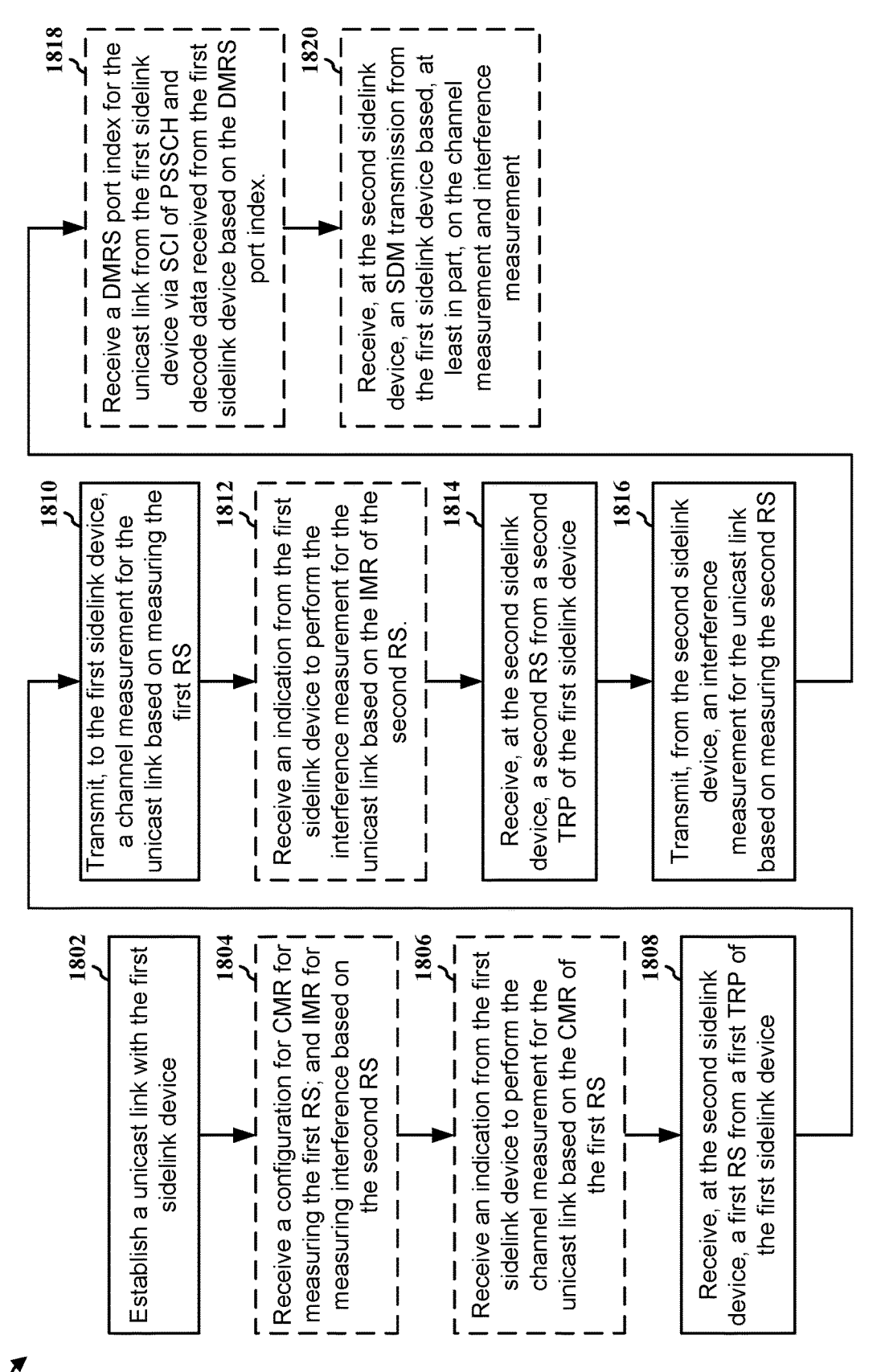
FIG. 18 is a flowchart of a method of wireless communication.

FIG. 18 is a flowchart 1800 of a method of wireless communication. The method may be performed between a first sidelink device and a second sidelink device or at a receiving sidelink device (e.g., the second sidelink device) based on sidelink communication (e.g., the UE 104, 402,

404, 406, 408, 604, 606, 608, 610, 804, 806; the receiving UE 1204, 1206; the receiving sidelink device 1304, 1306, 1404, 1406; the sidelink device 702; the device 310 or 350; the RSU 407; the apparatus 1902). Optional aspects are illustrated with a dashed line. The method may enable the second sidelink device to perform and report channel and interference measurements for a unicast link with the first sidelink device, and to receive SDM transmission for the unicast link based on the reported channel and interference measurements.

At 1802, the second sidelink device may establish a unicast link with the first sidelink device, such as described in connection with FIGS. 8, 12 to 15. For example, at 1450 of FIG. 14, the transmitting sidelink device 1402 may establish a first unicast link 1420 with a first receiving sidelink device 1404. The unicast link establishment may be performed, e.g. by the unicast link establishment component 1940 of the apparatus 1902 in FIG. 19.

At 1804, the second sidelink device may receive a configuration for CMR for measuring a first RS and IMR for measuring interference based on a second RS, such as described in connection with FIGS. 13 to 15. For example, at 1456 of FIG. 14, the second sidelink device 1404 may receive configuration for CMR resource 1426 from the transmitting sidelink device 1402 for performing channel measurement for the first unicast link 1420, and at 1466, the second sidelink device 1404 may receive configuration for IMR resource 1438 from the transmitting sidelink device 1402 for performing interference measurement for the unicast link 1420. The configuration/reception for CMR and/or the IMR may be performed, e.g. by the CMR/IMR processing component 1942 of the apparatus 1902 in FIG. 19.

At 1806, the second sidelink device may receive an indication from the first sidelink device to perform the channel measurement for the unicast link based on the CMR of the first RS, such as described in connection with FIGS. 13 and 14. For example, at 1458 of FIG. 14, the first receiving sidelink device 1404 may receive measurement indications from the transmitting sidelink device 1402 to perform the channel measurement for the first unicast link 1420 based on the CMR resource 1426 of the first RS 1412. The reception of the indication may be performed, e.g. by the measurement indication reception component 1944 and/ or the reception component 1930 of the apparatus 1902 in FIG. 19.

At 1808, the second sidelink device may receive, at the second sidelink device, a first RS from a first TRP of the first sidelink device, such as described in connection with FIGS. 13 and 14. For example, at 1460 of FIG. 14, the transmitting sidelink device 1402 may transmit, on the first unicast link 1420, the first RS 1412 from the first TRP 1408 of the transmitting sidelink device 1402. The reception of the first RS may be performed, e.g. by the RS reception component 1946 and/or the reception component 1930 of the apparatus 1902 in FIG. 19.

At 1810, the second sidelink device may transmit, to the first sidelink device, a channel measurement for the unicast link based on measuring the first RS, such as described in connection with FIGS. 13 and 14. For example, at 1462 of FIG. 14, the second sidelink device 1404 may transmit channel measurement 1432 for the first unicast link 1420 to the transmitting sidelink device 1402. The transmission of the channel measurement may be performed, e.g. by the channel measurement component 1948 and/or the transmission component 1934 of the apparatus 1902 in FIG. 19.

At 1812, the second sidelink device may receive an indication from the first sidelink device to perform the interference measurement for the unicast link based on the IMR of the second RS., such as described in connection with FIGS. 13 and 14. For example, at 1468 of FIG. 14, the first receiving sidelink device 1404 may receive a measurement indication from the transmitting sidelink device 1402 to perform interference measurement for the first unicast link 1420 based on the IMR resource 1438 of the second RS 1414. The reception of the indication may be performed, e.g by the measurement indication reception component 1944 and/or the reception component 1930 of the apparatus 1902 in FIG. 19. In one example, the indication to perform the channel measurement based on the CMR or the indication to perform the interference measurement based on the IMR may be received in SCI.

At 1814, the second sidelink device may receive, at the second sidelink device, a second RS from a second TRP of the first sidelink device, such as described in connection with FIGS. 13 and 14. For example, at 1470 of FIG. 14, the first receiving sidelink device 1404 may receive, on the second unicast link 1430, the second RS 1414 from the second TRP 1410 of the transmitting sidelink device 1402. The reception of the second RS may be performed, e.g. by the RS reception component 1946 and/or the reception component 1930 of the apparatus 1902 in FIG. 19.

In one example, the first RS and the second RS may include a CSI-RS. In such an example, the CMR and IMR may be included in a CSI-RS configuration, where the second sidelink device may receive the IMR from the first sidelink device based on ZP resources in the CSI-RS configuration. In another example, the CMR and/or the IMR may include resources for at least one of: control DMRS, data DMRS, data REs, or control REs.

At 1816, the second sidelink device may transmit, from the second sidelink device, an interference measurement for the unicast link based on measuring the second RS, such as described in connection with FIGS. 13 and 14. For example, at 1472 of FIG. 14, the first receiving sidelink device 1404 may transmit interference measurement 1444 for the first unicast link 1420 to the transmitting sidelink device 1402. The transmission of the interference measurement may be performed, e.g. by the interference measurement component 1950 and/or the transmission component 1934 of the apparatus 1902 in FIG. 19.

At 1818, the second sidelink device may receive a DMRS port index for the unicast link from the second sidelink device via SCI of PSSCH, and the second sidelink device may decode data received from the first sidelink device based on the DMRS port index, such as described in connection with FIGS. 13 and 14. For example, at 1478 of FIG. 14, the first receiving sidelink device 1404 may receive SDM indication that may include DMRS port index for the unicast link from the transmitting sidelink device 1402 via SCI. The reception of the DMRS port index may be performed, e.g by the reception component 1930 of the apparatus 1902 in FIG. 19.

At 1818, the second sidelink device may receive, at the second sidelink device, an SDM transmission from the first sidelink device based, at least in part, on the channel measurement and interference measurement, such as described in connection with FIGS. 13 and 14. For example, at 1480 of FIG. 14, the first receiving sidelink device 1404 may receive SDM transmission from the transmitting sidelink device 1402. The reception of the SDM transmission may be performed, e.g. by the SDM communication component 1952 and/or the reception component 1930 of the apparatus 1902 in FIG. 19.

In one example, the SDM may include a first spatial layer for the second sidelink device and having a first precoder and a second spatial layer for a third sidelink device and having a second precoder. In such example, the second sidelink device may receive the SDM transmission from the first spatial layer of the SDM.

In another example, the second sidelink device may receive an indication of a DMRS port index for a portion of the SDM transmission in a second stage SCI received in a PSSCH. In such example, the second sidelink device may receive a configuration of one or more parameters of an SDM in the second stage SCI. The one or more parameters may include at least one of a HARQ ID, a redundancy version, a destination ID, or a communication range requirement.

Figure 19:
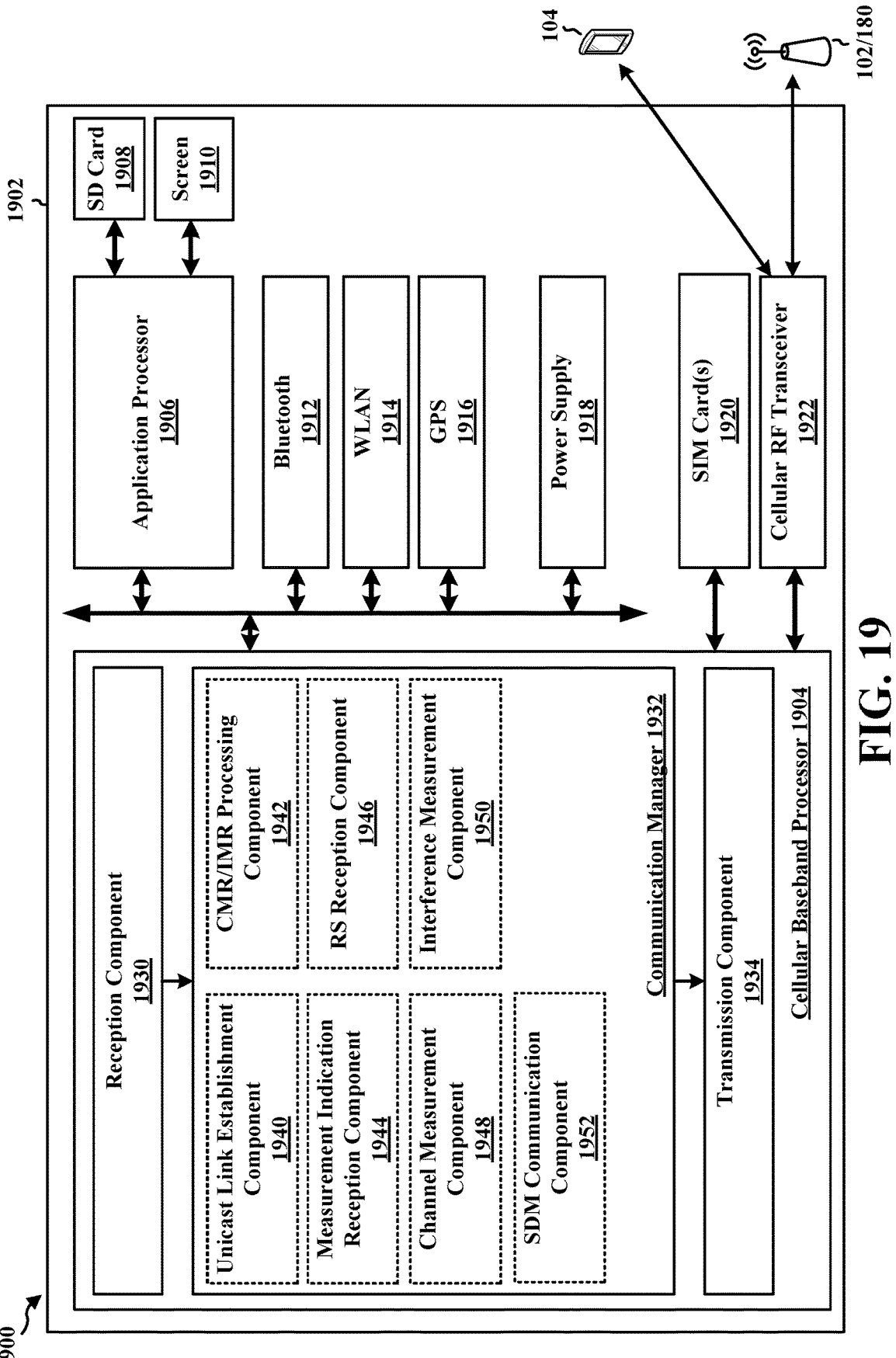
FIG. 19 is a diagram illustrating an example of a hardware implementation for an example apparatus.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or BS 102/190. The cellular baseband processor 1904 may include a computer-readable storage medium/memory. The computer-readable storage medium/memory may be non-transitory. The cellular baseband processor 1904 is responsible for general processing, including the execution of software stored on the computer-readable storage medium/memory. The software, when executed by the cellular baseband processor 1904, causes the cellular baseband processor 1904 to perform the various functions described supra. The computer-readable storage medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable storage medium/memory and/or configured as hardware within the cellular baseband processor 1904. The cellular baseband processor 1904 may be a component of the device 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire wireless device (e.g., see 350 of FIG. 3) and include the additional modules of the apparatus 1902.

The communication manager 1932 includes a unicast link establishment component 1940 that is configured to establish a unicast link with the first sidelink device, e.g., as described in connection with 1802 in FIG. 18. The communication manager 1932 further includes a CMR/IMR processing component 1942 configured to receive a configuration for CMR for measuring the first RS; and IMR for measuring interference based on the second RS, e.g., as described in connection with 1804 in FIG. 18. The communication manager 1932 further includes a measurement indication reception component 1944 configured to receive an indication from the first sidelink device to perform the channel measurement for the unicast link based on the CMR of the first RS and/or receive an indication from the first sidelink device to perform the interference measurement for the unicast link based on the IMR of the second RS., e.g., as described in connection with 1806 and/or 1812 in FIG. 18. The communication manager 1932 further includes a RS reception component 1946 configured to receive, at the second sidelink device, a first RS from a first TRP of the first sidelink device and/or receive, at the second sidelink device, a second RS from a second TRP of the first sidelink device, e.g., as described in connection with 1808 and/or 1814 in FIG. 18. The communication manager 1932 further includes a channel measurement component 1948 configured to transmit, to the first sidelink device, a channel measurement for the unicast link based on measuring the first RS, e.g., as described in connection with 1810 in FIG. 18. The communication manager 1932 further includes an interference measurement component 1950 configured to transmit, from the second sidelink device, an interference measurement for the unicast link based on measuring the second RS, e.g., as described in connection with 1816 in FIG. 18. The communication manager 1932 further includes an SDM communication component 1952 configured to receive, at the second sidelink device, an SDM transmission from the first sidelink device based, at least in part, on the channel measurement and interference measurement, e.g., as described in connection with 1820 in FIG. 18.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable storage medium for implementation by a processor, or some combination thereof.

In one configuration, the apparatus 1902, and in particular the cellular baseband processor 1904, includes means for establishing a unicast link with the first sidelink device (e.g., the unicast link establishment component 1940). The apparatus 1902 includes means for receiving, at the second sidelink device, a first RS from a first TRP of the first sidelink device (e.g., the RS reception component 1946 and/or the reception component 1930). The apparatus 1902 includes means for transmitting, to the first sidelink device, a channel measurement for the unicast link based on measuring the first RS (e.g., the channel measurement component 1948 and/or the transmission component 1934). The apparatus 1902 includes means for receiving, at the second sidelink device, a second RS from a second TRP of the first sidelink device (e.g., the RS reception component 1946 and/or the reception component 1930). The apparatus 1902 includes means for transmitting, from the second sidelink, device an interference measurement for the unicast link based on measuring the second RS (e.g., the interference measurement component 1950 and/or the transmission component 1934).

The apparatus 1902 may further include means for receiving, at the second sidelink device, an SDM transmission from the first sidelink device based, at least in part, on the channel measurement and interference measurement (e.g., the SDM communication component 1952 and/or the reception component 1930). The apparatus 1902 may further include means for receiving a configuration for CMR for measuring the first RS and IMR for measuring interference based on the second RS (e.g., CMR/IMR processing component 1942 and/or the reception component 1930). The apparatus 1902 may further include means for receiving an indication from the first sidelink device to perform the channel measurement for the unicast link based on the CMR of the first RS and means for receiving an indication from the first sidelink device to perform the interference measurement for the unicast link based on the IMR of the second RS (e.g., the measurement indication reception component 1944 and/or the reception component 1930). The apparatus 1902 may further include means for receiving a DMRS port index for the unicast link from the second sidelink device via SCI of PSSCH and means for decoding data received from the second sidelink device based on the DMRS port index (e.g., the SDM communication component 1952 and/or the reception component 1930). The apparatus 1902 may further include means for receiving an indication of a DMRS port index for a portion of the SDM transmission in a second stage SCI received in a PSSCH (e.g., the reception component 1930). The apparatus 1902 may further include means for receiving a configuration of one or more parameters of an SDM in the second stage SCI (e.g., the reception component 1930).

The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following aspects are illustrative only and may be combined with other aspects or teachings described herein, without limitation.

Aspect 1 is a method of wireless communication at a first sidelink device, comprising: establishing a first unicast link with a second sidelink device and a second unicast link with a third sidelink device; transmitting, on the first unicast link with the second sidelink device, a first RS from a first TRP of the first sidelink device; receiving, based on the first RS transmitted, a first channel measurement for the first unicast link from the second sidelink device and a first interference measurement for the second unicast link from the third sidelink device; transmitting, on the third unicast link with the second sidelink device, a second RS from a second TRP of the first sidelink device; receiving, based on the second RS transmitted, a second channel measurement for the second unicast link from the third sidelink device and a second interference measurement for the first unicast link from the second sidelink device; and applying SDM for the first unicast link and the second unicast link based on the first channel measurement, the second channel measurement, the first interference measurement of the first unicast link, and the second interference measurement of the second unicast link.

In aspect 2, the method of aspect 1 further includes that the first sidelink device transmits the first RS in a first slot and transmits the second RS in a second slot.

In aspect 3, the method of aspect 1 or aspect 2 further comprises: precoding the first RS with a first precoder; and precoding the second RS with a second precoder.

In aspect 4, the method of any of aspects 1-3 further includes that the first precoder is associated with a first spatial layer of an SDM transmission and the second precoder is associated with a second spatial layer of the SDM transmission.

In aspect 5, the method of any of aspects 1-4 further comprises: transmitting the SDM transmission comprises a first transmission to the second sidelink device via the first spatial layer and a second transmission to the third sidelink device via the second spatial layer using a same frequency and time resources.

In aspect 6, the method of any of aspects 1-5 further includes that the first RS and the second RS comprise a CSI-RS.

In aspect 7, the method of any of aspects 1-6 further comprises: configuring the second sidelink device with a first CMR for reception of the first RS; and configuring the third sidelink device with a first IMR for measurement of interference based on the first RS.

In aspect 8, the method of any of aspects 1-7 further comprises: configuring the third sidelink device with a second CMR for reception of the second RS; and configuring the second sidelink device with a second IMR for measurement of interference based on the second RS.

In aspect 9, the method of any of aspects 1-8 further includes that the first CMR and first IMR are comprised in a CSI-RS configuration.

In aspect 10, the method of any of aspects 1-9 further comprises: indicating the first IMR to the third sidelink device based on ZP resources in the CSI-RS configuration.

In aspect 11, the method of any of aspects 1-10 further includes that the first CMR and the second CMR comprise resources for control signaling.

In aspect 12, the method of any of aspects 1-11 further includes that the first IMR and the second IMR comprise resources for control signaling.

In aspect 13, the method of any of aspects 1-12 further includes that the first CMR and the second CMR comprise resources for a control DMRS.

In aspect 14, the method of any of aspects 1-13 further includes that the first IMR and the second IMR comprise resources for a control DMRS.

In aspect 15, the method of any of aspects 1-14 further includes that the first CMR and the second CMR comprise resources for data.

In aspect 16, the method of any of aspects 1-15 further includes that the first IMR and the second IMR comprise resources for data.

In aspect 17, the method of any of aspects 1-16 further comprises: indicating to the second sidelink device to perform the first channel measurement for the first unicast link based on the first CMR of the first RS; indicating to the third sidelink device to perform the first interference measurement for the second unicast link based on the first IMR of the first RS; indicating to the third sidelink device to perform the second channel measurement for the second unicast link based on the second CMR of the second RS; and indicating to the second sidelink device to perform the second interference measurement for the first unicast link based on the second IMR of the second RS.

In aspect 18, the method of any of aspects 1-17 further comprises: triggering channel measurement or interference measurement based on a number of transmission failure exceeding a threshold or a CBR exceeding a threshold for a corresponding unicast link.

In aspect 19, the method of any of aspects 1-18 further comprises: transmitting SCI that comprises one or more indications to perform channel measurements based on the first CMR or the second CMR or to perform interference measurements based on the first IMR or the second IMR.

In aspect 20, the method of any of aspects 1-19 further includes that one or more parameters associated with the first RS or the second RS are configured by a higher layer of the first sidelink device.

In aspect 21, the method of any of aspects 1-20 further comprises: determining a first SINR corresponding to a first precoder based on the first channel measurement for the first unicast link from the second sidelink device and the first interference measurement for the second unicast link from the third sidelink device; and determining a second SINR corresponding to a second precoder based on the second channel measurement for the second unicast link from the third sidelink device and the second interference measurement for the first unicast link from the second sidelink device, wherein the first sidelink device applies the SDM for transmission on the first unicast link and the second unicast link based on at least one of the first SINR and the second SINR meeting a threshold.

In aspect 22, the method of any of aspects 1-21 further comprises: indicating a DMRS port index for the first unicast link to the second sidelink device and a DMRS port index for the second unicast link to the third sidelink device via a second stage SCI transmitted in PSSCH.

In aspect 23, the method of any of aspects 1-22 further comprises: configuring, via the second stage SCI, one or more parameters associated with the SDM.

In aspect 24, the method of any of aspects 1-23 further includes that the one or more parameters comprise at least one of a HARQ ID, a redundancy version, a destination ID, or a communication range requirement.

Aspect 25 is an apparatus for wireless communication including at least one processor coupled to a memory and configured to implement a method as in any of aspects 1 to 24.

Aspect 26 is an apparatus for wireless communication including means for implementing a method as in any of aspects 1 to 24.

Aspect 27 is a non-transitory computer-readable storage medium storing computer executable code, where the code when executed by a processor causes the processor to implement a method as in any of aspects 1 to 24.

Aspect 28 is a method of wireless communication at a second sidelink device, comprising: establishing a unicast link with the first sidelink device; receiving, at the second sidelink device, a first RS from a first TRP of the first sidelink device; transmitting, to the first sidelink device, a channel measurement for the unicast link based on measuring the first RS; receiving, at the second sidelink device, a second RS from a second TRP of the first sidelink device; and transmitting, from the second sidelink device, an interference measurement for the unicast link based on measuring the second RS.

In aspect 29, the method of aspect 28 further comprises: receiving, at the second sidelink device, an SDM transmission from the first sidelink device based, at least in part, on the channel measurement and the interference measurement.

In aspect 30, the method of aspect 28 or aspect 29 further includes that the SDM transmission comprises: a first spatial layer for the second sidelink device and having a first precoder; and a second spatial layer for a third sidelink device and having a second precoder.

In aspect 31, the method of any of aspects 28-30 further includes that the second sidelink device receives the SDM transmission from the first spatial layer of the SDM transmission.

In aspect 32, the method of any of aspects 28-31 further includes that the first RS and the second RS comprise a CSI-RS.

In aspect 33, the method of any of aspects 28-32 further comprises: receiving a configuration for CMR for measuring the first RS and IMR for measuring interference based on the second RS.

In aspect 34, the method of any of aspects 28-33 further includes that the CMR is comprised in a CSI-RS configuration.

In aspect 35, the method of any of aspects 28-34 further includes that the IMR is comprised in a CSI-RS configuration.

In aspect 36, the method of any of aspects 28-35 further includes that the IMR is indicated based on ZP resources in the CSI-RS configuration.

In aspect 37, the method of any of aspects 28-36 further includes that the CMR and the IMR comprise resources for at least one of: control DMRS, data DMRS, data REs, or control REs.

In aspect 38, the method of any of aspects 28-37 further comprises: receiving an indication from the first sidelink device to perform the channel measurement for the unicast link based on the CMR of the first RS; and receiving an indication from the first sidelink device to perform the interference measurement for the unicast link based on the IMR of the second RS.

In aspect 39, the method of any of aspects 28-38 further includes that the indication to perform the channel measurement based on the CMR or the indication to perform the interference measurement based on the IMR is received in SCI.

In aspect 40, the method of any of aspects 28-39 further comprises: receiving a DMRS port index for the unicast link from the first sidelink device via SCI of PSSCH; and decoding data received from the first sidelink device based on the DMRS port index.

In aspect 41, the method of any of aspects 28-40 further comprises: receiving, at the second sidelink device, an SDM transmission from the first sidelink device based, at least in part, on the channel measurement and interference measurement; and receiving an indication of a DMRS port index for a portion of the SDM transmission in a second stage SCI received in a PSSCH.

In aspect 42, the method of any of aspects 28-41 further comprises: receiving, from the first sidelink device, a configuration of one or more parameters of an SDM in the second stage SCI.

In aspect 43, the method of any of aspects 28-42 further includes that the one or more parameters comprise at least one of a HARQ ID, a redundancy version, a destination ID, or a communication range requirement.

Aspect 44 is an apparatus for wireless communication including at least one processor coupled to a memory and configured to implement a method as in any of aspects 28 to 43.

Aspect 45 is an apparatus for wireless communication including means for implementing a method as in any of aspects 28 to 43.

Aspect 46 is a non-transitory computer-readable storage medium storing computer executable code, where the code when executed by a processor causes the processor to implement a method as in any of aspects 28 to 43.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first sidelink device, comprising:
   memory; and
   one or more processors coupled to the memory and configured to cause the first sidelink device to:
      establish a first unicast link with a second sidelink device and a second unicast link with a third sidelink device;
      transmit, on the first unicast link with the second sidelink device, a first reference signal (RS) from a first transmission reception point (TRP) of the first sidelink device;
      receive, based on the first RS, a first channel measurement for the first unicast link from the second sidelink device and a first interference measurement for the second unicast link from the third sidelink device;
      transmit, on the second unicast link with the third sidelink device, a second RS from a second TRP of the first sidelink device;
      receive, based on the second RS, a second channel measurement for the second unicast link from the third sidelink device and a second interference measurement for the first unicast link from the second sidelink device;
      apply space division multiplexing (SDM) for the first unicast link and the second unicast link based on the first channel measurement, the second channel measurement, the first interference measurement of the first unicast link, and the second interference measurement of the second unicast link; and
      transmit, based on the SDM, a first transmission to the second sidelink device via the first unicast link and a second transmission to the third sidelink device via the second unicast link with same frequency and time resources.

2. The apparatus of claim 1, wherein to transmit the first RS, the one or more processors are configured to cause the first sidelink device to transmit the first RS in a first slot, and wherein to transmit the second RS, the one or more processors are configured to cause the first sidelink device to transmit the second RS in a second slot.

3. The apparatus of claim 1, wherein the one or more processors are further configured to cause the first sidelink device to:
   precode the first RS with a first precoder; and
   precode the second RS with a second precoder.

4. The apparatus of claim 3, wherein the first precoder is associated with a first spatial layer of an SDM transmission and the second precoder is associated with the SDM a second spatial layer of transmission.

5. The apparatus of claim 4, wherein to transmit, based on the SDM, the first transmission to the second sidelink device via the first unicast link and the second transmission to the third sidelink device via the second unicast link with the same frequency and time resources, the one or more processors are configured to cause the first sidelink device to:
   transmit the SDM transmission that includes the first transmission to the second sidelink device via the first spatial layer and the second transmission to the third sidelink device via the second spatial layer with the same frequency and time resources.

6. The apparatus of claim 1, wherein the first RS and the second RS comprise a channel state information reference signal (CSI-RS).

7. The apparatus of claim 1, wherein the one or more processors are further configured to cause the first sidelink device to:
   configure the second sidelink device with a first channel measurement resource (CMR) for reception of the first RS; and
   configure the third sidelink device with a first interference measurement resource (IMR) for measurement of interference based on the first RS.

8. The apparatus of claim 7, wherein the one or more processors are further configured to cause the first sidelink device to:
   configure the third sidelink device with a second CMR for reception of the second RS; and configure the second sidelink device with a second IMR for measurement of interference based on the second RS.

9. The apparatus of claim 8, wherein the first CMR and the first IMR are comprised in a channel state information reference signal (CSI-RS) configuration.

10. The apparatus of claim 9, wherein the one or more processors are further configured to:

indicate the first IMR to the third sidelink device based on zero power (ZP) resources in the CSI-RS configuration.

11. The apparatus of claim 8, wherein the first CMR and the second CMR comprise resources for at least one of: a control signal, a control demodulation reference signal (DMRS), or data.

12. The apparatus of claim 8, wherein the first IMR and the second IMR comprise resources for at least one of: a control signal, a control demodulation reference signal (DMRS), or data.

13. The apparatus of claim 8, wherein the one or more processors are further configured to cause the first sidelink device to:

indicate to the second sidelink device to perform the first channel measurement for the first unicast link based on the first CMR of the first RS;

indicate to the third sidelink device to perform the first interference measurement for the second unicast link based on the first IMR of the first RS;

indicate to the third sidelink device to perform the second channel measurement for the second unicast link based on the second CMR of the second RS; and indicate to the second sidelink device to perform the second interference measurement for the first unicast link based on the second IMR of the second RS.

14. The apparatus of claim 8, wherein the one or more processors are further configured to cause the first sidelink device to:

trigger channel measurement or interference measurement based on a number of transmission failures that exceeds a first threshold or a channel busy ratio (CBR) that exceeds a second threshold for a corresponding unicast link.

15. The apparatus of claim 8, wherein the one or more processors are further configured to cause the first sidelink device to:

transmit sidelink control information (SCI) that comprises one or more indications to perform channel measurements based on the first CMR or the second CMR or to perform interference measurements based on the first IMR or the second IMR.

16. The apparatus of claim 1, wherein one or more parameters associated with the first RS or the second RS are configured by a higher layer of the first sidelink device.

17. The apparatus of claim 1, wherein the one or more processors are further configured to cause the first sidelink device to:

determine a first signal-to-interference-plus-noise-ratio (SINR) corresponding to a first precoder based on the first channel measurement for the first unicast link from the second sidelink device and the first interference measurement for the second unicast link from the third sidelink device; and determine a second SINR corresponding to a second precoder based on the second channel measurement for the second unicast link from the third sidelink device and the second interference measurement for the first unicast link from the second sidelink device, wherein the first sidelink device applies the SDM for transmission on the first unicast link and the second unicast link based on at least one of the first SINR and the second SINR that meets a threshold.

18. The apparatus of claim 1, wherein the one or more processors are further configured to cause the first sidelink device to:

indicate a demodulation reference signal (DMRS) port index for the first unicast link to the second sidelink device and a DMRS port index for the second unicast link to the third sidelink device via a sidelink control second stage information (SCI) transmitted in physical sidelink shared channel (PSSCH).

19. The apparatus of claim 18, wherein the one or more processors are further configured to cause the first sidelink device to:

configure, via the second stage SCI, one or more parameters associated with the SDM, wherein the one or more parameters comprise at least one of a hybrid automatic repeat request (HARQ) process identifier (ID), a redundancy version, a destination ID, or a communication range requirement.

20. An apparatus for wireless communication at a second sidelink device, comprising:

memory; and one or more processors coupled to the memory and configured to cause the second sidelink device to:

establish a unicast link with a first sidelink device;

receive, at the second sidelink device, a first reference signal (RS) from a first transmission reception point (TRP) of the first sidelink device;

transmit, to the first sidelink device, a channel measurement for the unicast link based on measurement of the first RS;

receive, at the second sidelink device, a second RS from a second TRP of the first sidelink device;

transmit, from the second sidelink device, an interference measurement for the unicast link based on measurement of the second RS; and receive, at the second sidelink device, a space division multiplexing (SDM) transmission from the first sidelink device based, at least in part, on the channel measurement and the interference measurement, wherein the received SDM transmission includes multiple transmissions for multiple sidelink devices with same time and frequency resources.

21. The apparatus of claim 20, wherein the SDM transmission comprises:

a first spatial layer for the second sidelink device that has a first precoder, and a second spatial layer for a third sidelink device that has a second precoder.

22. The apparatus of claim 21, wherein to receive the SDM transmission, the one or more processors are configured to cause the second sidelink device to receive the SDM transmission from the first spatial layer of the SDM transmission.

23. The apparatus of claim 20, wherein the first RS and the second RS comprise a channel state information reference signal (CSI-RS).

24. The apparatus of claim 20, wherein the one or more processors are further configured to cause the second sidelink device to:

receive a configuration for channel measurement resource (CMR) for measuring the first RS and interference measurement resource (IMR) for measuring interference based on the second RS.

25. The apparatus of claim 24, wherein at least one of the CMR or the IMR is comprised in a channel state information reference signal (CSI-RS) configuration.

26. The apparatus of claim 25, wherein the IMR is indicated based on zero power (ZP) resources in the CSI-RS configuration.

27. The apparatus of claim 24, wherein the CMR and the IMR comprise resources for at least one of:
control demodulation reference signal (DMRS),
data DMRS,
data resource elements (REs), or
control REs.

28. The apparatus of claim 24, wherein the one or more processors are further configured to cause the second sidelink device to:
receive a first indication from the first sidelink device to perform the channel measurement for the unicast link based on the CMR of the first RS; and
receive a second indication from the first sidelink device to perform the interference measurement for the unicast link based on the IMR of the second RS.

29. The apparatus of claim 28, wherein the first indication to perform the channel measurement based on the CMR or the second indication to perform the interference measurement based on the IMR is received in sidelink control information (SCI).

30. The apparatus of claim 20, wherein the one or more processors are further configured to cause the second sidelink device to:
receive a demodulation reference signal (DMRS) port index for the unicast link from the first sidelink device via sidelink control information (SCI) of physical sidelink shared channel (PSSCH); and
decode data received from the first sidelink device based on the DMRS port index.

31. The apparatus of claim 20, wherein the one or more processors are further configured to cause the second sidelink device to:
receive an indication of a demodulation reference signal (DMRS) port index for a portion of the SDM transmission in a second stage sidelink control information (SCI) received in a physical sidelink shared channel (PSSCH).

32. The apparatus of claim 31, wherein the one or more processors are further configured to cause the second sidelink device to:
receive, from the first sidelink device, a configuration of one or more parameters of an SDM in the second stage SCI, wherein the one or more parameters comprise at least one of a hybrid automatic repeat request (HARQ) process identifier (ID), a redundancy version, a destination ID, or a communication range requirement.

33. A method of wireless communication at a first sidelink device, comprising:
establishing a first unicast link with a second sidelink device and a second unicast link with a third sidelink device;

transmitting, on the first unicast link with the second sidelink device, a first reference signal (RS) from a first transmission reception point (TRP) of the first sidelink device;
receiving, based on the first RS, a first channel measurement for the first unicast link from the second sidelink device and a first interference measurement for the second unicast link from the third sidelink device;
transmitting, on the second unicast link with the third sidelink device, a second RS from a second TRP of the first sidelink device;
receiving, based on the second RS, a second channel measurement for the second unicast link from the third sidelink device and a second interference measurement for the first unicast link from the second sidelink device; and
applying space division multiplexing (SDM) for the first unicast link and the second unicast link based on the first channel measurement, the second channel measurement, the first interference measurement of the first unicast link, and the second interference measurement of the second unicast link.

34. The method of claim 33, further comprising:
configuring the second sidelink device with a first channel measurement resource (CMR) for reception of the first RS;
configure the third sidelink device with a first interference measurement resource (IMR) for measurement of interference based on the first RS;
configure the third sidelink device with a second CMR for reception of the second RS; and
configure the second sidelink device with a second IMR for measurement of interference based on the second RS, wherein at least one of the first CMR, the second CMR, the first IMR, or the second IMR comprises resources for at least one of: control signaling, a control demodulation reference signal (DMRS), or data.

35. A method of wireless communication at a second sidelink device, comprising:
establishing a unicast link with a first sidelink device;
receiving, at the second sidelink device, a first reference signal (RS)) from a first transmission reception point (TRP) of the first sidelink device;
transmitting, to the first sidelink device, a channel measurement for the unicast link based on measuring the first RS;
receiving, at the second sidelink device, a second RS from a second TRP of the first sidelink device;
transmitting, from the second sidelink device, an interference measurement for the unicast link based on measuring the second RS; and
receiving, at the second sidelink device, a space division multiplexing (SDM) transmission from the first sidelink device based, at least in part, on the channel measurement and the interference measurement, wherein the SDM transmission includes multiple transmissions for multiple sidelink devices with same time and frequency resources.

* * * * *